United States Patent
Li et al.

(10) Patent No.: US 11,025,923 B2
(45) Date of Patent: Jun. 1, 2021

(54) HASH-BASED ENCODER DECISIONS FOR VIDEO CODING

(71) Applicant: Microsoft Technology Licensing, LLC, Redmond, WA (US)

(72) Inventors: Bin Li, Beijing (CN); Ji-Zheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 15/508,067

(22) PCT Filed: Sep. 30, 2014

(86) PCT No.: PCT/CN2014/087869
§ 371 (c)(1),
(2) Date: Mar. 1, 2017

(87) PCT Pub. No.: WO2016/049834
PCT Pub. Date: Apr. 7, 2016

(65) Prior Publication Data
US 2017/0302936 A1    Oct. 19, 2017

(51) Int. Cl.
*H04N 19/176* (2014.01)
*H04N 19/142* (2014.01)
(Continued)

(52) U.S. Cl.
CPC ........... *H04N 19/176* (2014.11); *H04N 19/14* (2014.11); *H04N 19/142* (2014.11); *H04N 19/154* (2014.11); *H04N 19/503* (2014.11)

(58) Field of Classification Search
USPC ..................................... 375/240.16
See application file for complete search history.

(56) References Cited

U.S. PATENT DOCUMENTS

| 2,239,538 A | 4/1941 | Richter |
| 2,718,173 A | 9/1955 | Hacman et al. |

(Continued)

FOREIGN PATENT DOCUMENTS

| CN | 1857001 | 11/2006 |
| CN | 1874487 | 12/2006 |

(Continued)

OTHER PUBLICATIONS

Wei et al., "An Efficient Intra-Mode Selection Algorithm for H.264 Based on Edge Classification and Rate-Distortion Estimation," Signal Processing: Image Communication vol. 23, No. 9, pp. 699-710, Oct. 1, 2008 (Year: 2008).*

(Continued)

*Primary Examiner* — Christopher S Kelley
*Assistant Examiner* — Ana Picon-Feliciano
(74) *Attorney, Agent, or Firm* — Klarquist Sparkman, LLP

(57) ABSTRACT

Innovations in encoder-side decisions that use the results of hash-based block matching are presented. For example, some of the innovations relate to ways of building hash tables that include some (but not all) uniform blocks. Other innovations relate to ways of determining motion vector resolution based on results of hash-based block matching. Still other innovations relate to scene change detection, including long-term reference picture selection and picture quality determination during encoding.

20 Claims, 13 Drawing Sheets

(51) Int. Cl.
*H04N 19/14* (2014.01)
*H04N 19/503* (2014.01)
*H04N 19/154* (2014.01)

(56) References Cited

U.S. PATENT DOCUMENTS

| | | | |
|---|---|---|---|
| 3,059,528 A | 10/1962 | Allan | |
| 3,642,351 A | 2/1972 | Tronnier et al. | |
| 5,016,980 A | 5/1991 | Waldron | |
| 5,565,921 A | 10/1996 | Sasaki et al. | |
| 5,610,841 A | 3/1997 | Tanaka et al. | |
| 5,613,004 A | 3/1997 | Cooperman et al. | |
| 5,687,236 A | 11/1997 | Moskowitz et al. | |
| 5,689,365 A | 11/1997 | Takahashi | |
| 5,774,271 A | 6/1998 | Lagerway et al. | |
| 5,850,312 A | 12/1998 | Kato et al. | |
| 6,332,092 B1 | 12/2001 | Deckert et al. | |
| 6,487,440 B2 | 11/2002 | Deckert et al. | |
| 6,618,197 B1 | 9/2003 | Hayakawa | |
| 6,879,266 B1 | 4/2005 | Dye et al. | |
| 6,894,289 B2 | 5/2005 | Nilson et al. | |
| 6,904,110 B2 | 6/2005 | Trans et al. | |
| 6,915,387 B1 | 7/2005 | Huffman et al. | |
| 6,938,128 B1 | 8/2005 | Kuskin et al. | |
| 6,983,020 B2 | 1/2006 | Christiansen | |
| 7,046,460 B2 | 5/2006 | Nozawa | |
| 7,206,346 B2 | 4/2007 | Shimizu et al. | |
| 7,216,232 B1 | 5/2007 | Cox et al. | |
| 7,239,454 B2 | 7/2007 | Kobayashi et al. | |
| 7,325,141 B2 | 1/2008 | Chow et al. | |
| 7,328,153 B2 | 2/2008 | Wells et al. | |
| 7,349,583 B2 | 3/2008 | Kumar et al. | |
| 7,379,499 B2 | 5/2008 | Dahlhoff et al. | |
| 7,400,774 B2 | 7/2008 | Puri et al. | |
| 7,421,128 B2 | 9/2008 | Venkatesan et al. | |
| 7,430,670 B1 | 9/2008 | Horning et al. | |
| 7,466,418 B2 | 12/2008 | Nilson et al. | |
| 7,606,974 B2 | 10/2009 | Dai et al. | |
| 7,609,763 B2 | 10/2009 | Mukerjee et al. | |
| 7,613,364 B2 | 11/2009 | Kang et al. | |
| 7,636,824 B1 | 12/2009 | Tormasov | |
| 7,672,005 B1 | 3/2010 | Hobbs et al. | |
| 7,702,127 B2 | 4/2010 | Mihcak et al. | |
| 7,706,682 B2 | 4/2010 | Keller et al. | |
| 7,733,497 B2 | 6/2010 | Yun et al. | |
| 7,747,584 B1 | 6/2010 | Jernigan, IV | |
| 7,761,712 B2 | 7/2010 | Moskowitz et al. | |
| 7,868,792 B2 | 1/2011 | Artan et al. | |
| 7,870,393 B2 | 1/2011 | Moskowitz et al. | |
| 7,873,786 B1 | 1/2011 | Singh et al. | |
| 7,912,244 B2 | 3/2011 | Mihcak et al. | |
| 7,949,186 B2 | 5/2011 | Grauman et al. | |
| 7,986,844 B2 | 7/2011 | Diamant et al. | |
| 8,003,186 B2 | 8/2011 | Ishizaki et al. | |
| 8,005,142 B2 | 8/2011 | Kim et al. | |
| 8,041,677 B2 | 10/2011 | Sumner et al. | |
| 8,077,989 B1 | 12/2011 | Hobbs et al. | |
| 8,086,052 B2 | 12/2011 | Toth et al. | |
| 8,099,415 B2 | 1/2012 | Luo et al. | |
| 8,099,601 B2 | 1/2012 | Serret-Avila et al. | |
| 8,107,527 B1 | 1/2012 | Hobbs et al. | |
| 8,126,282 B2 | 2/2012 | Jung et al. | |
| 8,197,397 B2 | 6/2012 | Rovegno | |
| 8,213,503 B2 | 7/2012 | Tu et al. | |
| 8,213,515 B2 | 7/2012 | Kudana et al. | |
| 8,264,489 B2 | 9/2012 | Saint-Hilaire et al. | |
| 8,284,484 B2 | 10/2012 | Hoult et al. | |
| 8,295,617 B2 | 10/2012 | Collins | |
| 8,320,683 B2 | 11/2012 | Konishi | |
| 8,335,255 B2 | 12/2012 | Lee et al. | |
| 8,355,437 B2 | 1/2013 | Hannuksela | |
| 8,411,750 B2 | 4/2013 | Dane | |
| 8,417,039 B2 | 4/2013 | Albu et al. | |
| 8,442,942 B2 | 5/2013 | Leppard | |
| 8,515,123 B2 | 8/2013 | Thorwirth | |
| 8,619,857 B2 | 12/2013 | Zhao et al. | |
| 8,644,620 B1 | 2/2014 | Lam | |
| 8,681,870 B2 | 3/2014 | Takada | |
| 8,787,460 B1 | 7/2014 | Hobbs | |
| 8,897,512 B1 | 11/2014 | Bozinovic et al. | |
| 9,167,020 B2 | 10/2015 | Abdo et al. | |
| 9,223,534 B1 | 12/2015 | Eilam | |
| 9,225,979 B1 | 12/2015 | Jia et al. | |
| 9,235,313 B2 | 1/2016 | Wu et al. | |
| 9,277,237 B2 | 3/2016 | Abiezzi et al. | |
| 9,286,862 B2 | 3/2016 | Peacock | |
| 9,332,270 B2 | 5/2016 | Ju | |
| 2001/0001614 A1 | 5/2001 | Boice et al. | |
| 2002/0041629 A1 | 4/2002 | Hannuksela | |
| 2002/0118755 A1 | 8/2002 | Karczewicz et al. | |
| 2003/0169918 A1 | 9/2003 | Sogawa | |
| 2003/0179206 A1* | 9/2003 | Emerson | G06F 3/1454 345/501 |
| 2003/0179951 A1 | 9/2003 | Christiansen | |
| 2003/0187587 A1 | 10/2003 | Swindells et al. | |
| 2004/0131014 A1 | 7/2004 | Thompson et al. | |
| 2004/0133548 A1 | 7/2004 | Fielding et al. | |
| 2004/0174570 A1 | 9/2004 | Plunkett et al. | |
| 2004/0223549 A1 | 11/2004 | Karczewicz et al. | |
| 2005/0060643 A1 | 3/2005 | Glass et al. | |
| 2005/0166040 A1 | 7/2005 | Wallmsley | |
| 2006/0062303 A1 | 3/2006 | Xu | |
| 2006/0132931 A1 | 6/2006 | Epple et al. | |
| 2006/0153295 A1 | 7/2006 | Wang et al. | |
| 2006/0224594 A1 | 10/2006 | Goyal et al. | |
| 2007/0025442 A1 | 2/2007 | Okada et al. | |
| 2007/0036226 A1 | 2/2007 | Kim et al. | |
| 2007/0041066 A1 | 2/2007 | Yasuda et al. | |
| 2007/0053662 A1 | 3/2007 | Tobita et al. | |
| 2007/0086526 A1 | 4/2007 | Koto et al. | |
| 2007/0092147 A1 | 4/2007 | Guionnet et al. | |
| 2007/0116110 A1 | 5/2007 | Diamant et al. | |
| 2007/0199011 A1 | 8/2007 | Zhang et al. | |
| 2007/0217702 A1 | 9/2007 | Sung | |
| 2008/0104652 A1 | 5/2008 | Swenson et al. | |
| 2008/0212687 A1 | 9/2008 | Liu | |
| 2009/0022374 A1 | 1/2009 | Boult | |
| 2009/0115909 A1 | 5/2009 | Walls et al. | |
| 2009/0129466 A1 | 5/2009 | Cho et al. | |
| 2009/0244299 A1 | 10/2009 | Fukunishi | |
| 2010/0057750 A1 | 3/2010 | Aasted et al. | |
| 2010/0119170 A1 | 5/2010 | Sengamedu et al. | |
| 2010/0166073 A1 | 7/2010 | Schmit et al. | |
| 2010/0177893 A1 | 7/2010 | Jeon et al. | |
| 2010/0268836 A1 | 10/2010 | Jabri et al. | |
| 2010/0284460 A1 | 11/2010 | Tsai et al. | |
| 2010/0284471 A1 | 11/2010 | Tsai et al. | |
| 2010/0293248 A1 | 11/2010 | Kamay et al. | |
| 2011/0007801 A1 | 1/2011 | Andersson et al. | |
| 2011/0010396 A1 | 1/2011 | Zhou | |
| 2011/0044551 A1 | 2/2011 | Lee et al. | |
| 2011/0051809 A1 | 3/2011 | Lee | |
| 2011/0128810 A1 | 6/2011 | Sato | |
| 2011/0179341 A1 | 7/2011 | Falls et al. | |
| 2011/0225114 A1 | 9/2011 | Gotthardt | |
| 2011/0243234 A1 | 10/2011 | Kondo et al. | |
| 2011/0293013 A1 | 12/2011 | Ma et al. | |
| 2011/0299785 A1 | 12/2011 | Albu et al. | |
| 2011/0311042 A1 | 12/2011 | Cheddad et al. | |
| 2012/0057631 A1 | 3/2012 | Le Leannec | |
| 2012/0128064 A1 | 5/2012 | Sato | |
| 2012/0170653 A1 | 7/2012 | Panusopone et al. | |
| 2012/0213282 A1 | 8/2012 | Choi et al. | |
| 2012/0245688 A1 | 9/2012 | Vanaclocha Vanaclocha | |
| 2012/0294523 A1 | 11/2012 | Abdo et al. | |
| 2013/0013618 A1 | 1/2013 | Heller et al. | |
| 2013/0022113 A1 | 1/2013 | Chen et al. | |
| 2013/0034158 A1 | 2/2013 | Kirchhoffer et al. | |
| 2013/0034159 A1 | 2/2013 | Siekmann et al. | |
| 2013/0036289 A1 | 2/2013 | Welnicki et al. | |
| 2013/0057646 A1 | 3/2013 | Chen et al. | |
| 2013/0057666 A1 | 3/2013 | Fujii | |
| 2013/0067344 A1 | 3/2013 | Ungureanu et al. | |
| 2013/0078592 A1 | 3/2013 | Mccarthy | |

(56) References Cited

U.S. PATENT DOCUMENTS

| | | | |
|---|---|---|---|
| 2013/0084018 A1 | 4/2013 | Nystad | |
| 2013/0114704 A1 | 5/2013 | Chen et al. | |
| 2013/0142447 A1 | 6/2013 | Park et al. | |
| 2013/0147974 A1 | 6/2013 | Ju et al. | |
| 2013/0148721 A1 | 6/2013 | Chen et al. | |
| 2013/0176560 A1 | 7/2013 | Wax et al. | |
| 2013/0208810 A1 | 8/2013 | Shen et al. | |
| 2013/0243089 A1 | 9/2013 | Lim et al. | |
| 2013/0258052 A1 | 10/2013 | Li et al. | |
| 2013/0266073 A1 | 10/2013 | MacInnis et al. | |
| 2013/0266078 A1 | 10/2013 | Deligiannis et al. | |
| 2013/0268621 A1 | 10/2013 | Mese et al. | |
| 2013/0271565 A1 | 10/2013 | Chen et al. | |
| 2013/0272394 A1* | 10/2013 | Brockmann | G06T 9/00 375/240.12 |
| 2013/0279564 A1 | 10/2013 | Wang | |
| 2013/0279577 A1 | 10/2013 | Schwarz et al. | |
| 2013/0279806 A1 | 10/2013 | Tonisson et al. | |
| 2013/0335527 A1 | 12/2013 | Takahashi et al. | |
| 2014/0002603 A1 | 1/2014 | Takahashi et al. | |
| 2014/0003506 A1 | 1/2014 | Wang et al. | |
| 2014/0010294 A1 | 1/2014 | Ye et al. | |
| 2014/0016698 A1 | 1/2014 | Joshi et al. | |
| 2014/0029668 A1 | 1/2014 | Lim et al. | |
| 2014/0050413 A1 | 2/2014 | Sato | |
| 2014/0064360 A1 | 3/2014 | Rapaka et al. | |
| 2014/0092994 A1 | 4/2014 | Wang | |
| 2014/0321553 A1 | 10/2014 | Clark | |
| 2014/0369413 A1* | 12/2014 | Clark | H04N 19/51 375/240.16 |
| 2014/0369421 A1 | 12/2014 | Zhu et al. | |
| 2015/0054946 A1 | 2/2015 | Zhang | |
| 2015/0063451 A1 | 3/2015 | Zhu et al. | |
| 2015/0092840 A1 | 4/2015 | Mochizuki et al. | |
| 2015/0261884 A1* | 9/2015 | Pang | H04N 19/136 707/741 |
| 2016/0125242 A1 | 5/2016 | Hawkins | |
| 2016/0234530 A1 | 8/2016 | Xu et al. | |
| 2016/0241876 A1 | 8/2016 | Xu et al. | |
| 2016/0269732 A1 | 9/2016 | Li et al. | |
| 2016/0277733 A1 | 9/2016 | Li et al. | |
| 2016/0277761 A1 | 9/2016 | Li et al. | |
| 2017/0163999 A1 | 6/2017 | Li et al. | |
| 2018/0063540 A1 | 3/2018 | Zhu et al. | |
| 2018/0152699 A1 | 5/2018 | Kumar et al. | |

FOREIGN PATENT DOCUMENTS

| | | |
|---|---|---|
| CN | 1874519 | 12/2006 |
| CN | 101283578 | 10/2008 |
| CN | 101710324 | 5/2010 |
| CN | 101866366 | 10/2010 |
| CN | 102576411 | 7/2012 |
| CN | 103281538 | 9/2013 |
| CN | 103430549 | 12/2013 |
| CN | 103841426 | 6/2014 |
| CN | 104574440 | 4/2015 |
| CN | 106415607 A | 2/2017 |
| CN | 105981382 | 5/2019 |
| EP | 1349395 | 10/2003 |
| EP | 2996360 | 3/2016 |
| GB | 2375673 | 11/2002 |
| GB | 2460844 | 12/2009 |
| JP | H11-66301 | 3/1999 |
| JP | 2005-522083 | 7/2005 |
| JP | 2010508734 | 3/2010 |
| JP | 2013058873 A | 3/2013 |
| RU | 2298226 C1 | 4/2007 |
| WO | WO 00/60874 | 10/2000 |
| WO | WO 02/093934 | 11/2002 |
| WO | WO 2010/085899 | 8/2010 |
| WO | WO 2010/086548 | 8/2010 |
| WO | 2011103206 A1 | 8/2011 |
| WO | 2011153005 | 12/2011 |
| WO | WO 2013/055923 | 4/2013 |
| WO | WO 2013/068433 | 5/2013 |
| WO | WO 2013/072484 | 5/2013 |
| WO | WO 2013/103376 | 7/2013 |
| WO | WO 2013/159038 | 10/2013 |
| WO | 2015131325 | 9/2015 |
| WO | 2015139165 | 9/2015 |
| WO | 2016018422 A1 | 2/2016 |

OTHER PUBLICATIONS

Supplementary Partial European Search Report dated Sep. 27, 2017, from European Application No. 14903205.4, 14 pages.

Wei et al., "An Efficient Intra-Mode Selection Algorithm for H.264 Based on Edge Classification and Rate-Distortion Estimation," Signal Processing: Image Communication vol. 23, No. 9, pp. 699-710, Oct. 1, 2008 (retrieved Aug. 22, 2008).

Li et al., "An HEVC-Based Screen Content Coding Scheme," JCTVC ITU-T SG16 WP3 and ISO/IEC JTC1/SC29/WG11 17th Meeting, 13 pp., Mar. 27, 2014 (retrieved Jan. 27, 2016).

"Final Office Action Issued in U.S. Appl. No. 15/321,536", dated May 10, 2019, 63 Pages.

"Office Action Issued in Australian Patent Application No. 2014408223", dated Mar. 14, 2019, 4 Pages.

"Supplementary Partial European Search Report Issued in European Patent Application No. 14885049.8", dated Feb. 16, 2017, 7 Pages.

"Final Office Action issued in U.S. Appl. No. 15/024,812", dated Apr. 6, 2018, 123 Pages.

"Non Final Office Action Issued in U.S. Appl. No. 15/029,589", dated Jul. 31, 2018, 45 Pages.

"Non Final Office Action Issued in U.S. Appl. No. 15/253,568", dated May 1, 2018, 7 Pages.

"Final Office Action Issued in U.S. Appl. No. 15/321,536", dated Apr. 9, 2018, 58 Pages.

"Non Final Office Action Issued in U.S. Appl. No. 15/365,927", dated Aug. 27, 2018, 22 Pages.

"Search Report Issued in European Patent Application No. 18176302.0", dated Aug. 21, 2018, 7 Pages.

"Office Action and Search Report Issued in Chinese Patent Application No. 201480048046.9", dated May 3, 2018, 14 Pages.

"Office Action Issued in Russian Patent Application No. 2017110461", dated Jul. 12, 2018, 7 Pages. (W/o English Translation).

Li, Bin, et al., "Improvement for hash based inter search", In 19th meeting of Joint Collaborative Team on Video Coding (JCT-VC) of ITU-T SG 16 WP 3 and ISO/IEC JTC I/SC 29/WG 11, Oct. 17, 2014, 4 Pages.

"International Preliminary Report on Patentability Issued in PCT Application No. PCT/CN2013/085937", dated May 6, 2016, 7 Pages.

"International Preliminary Report on Patentability Issued in PCT Application No. PCT/CN2013/085939", dated May 6, 2016, 6 Pages.

"International Preliminary Report on Patentability Issued in PCT Application No. PCT/CN2014/072827", dated Sep. 15, 2016, 6 Pages.

"International Preliminary Report on Patentability Issued in PCT Application No. PCT/CN2014/072834", dated Sep. 15, 2016, 6 Pages.

"International Preliminary Report on Patentability Issued in PCT Application No. PCT/CN2014/080481", dated Jan. 5, 2017, 7 Pages.

"International Search Report and Written Opinion Issued in PCT Application No. PCT/US2017/063164", dated May 3, 2018, 27 Pages.

"Final Office Action Issued in U.S. Appl. No. 15/024,816", dated Apr. 16, 2019, 73 Pages.

Chen et al., "Description of Screen Content Coding Technology Proposal by Qualcomm," JCTVC-Q0031, 18 pp. (Mar. 2014).

Li et al., "Screen content coding using dictionary based mode," JCTVC-P0214_r1, 5 pp. (Jan. 2014).

Ribas-Corbera et al., "Optimizing Motion-Vector Accuracy in Block-Based Video Coding," IEEE Trans. On Circuits and Systems for Video Technology, vol. 11, No. 4, pp. 497-511 (Apr. 2001).

(56) References Cited

OTHER PUBLICATIONS

Zhou et al., "Motion Vector Resolution Control for Screen Content Coding," JCTVC-P0277, 5 pp. (Jan. 2014).
Ascenso et al., "Adaptive Hash-Based Side Information Exploitation for Efficient Wyner-Ziv Video Coding," IEEE Int'l Conf. on Image Processing, 4 pp. (Sep. 2007).
Bankoski et al., "VP8 Data Format and Decoding Guide," RFC 6386, 304 pp. (Nov. 2011).
Flynn et al., "High Efficiency Video Coding (HEVC) Range Extensions text specification: Draft 4," JCTVC-N1005, 322 pp. (Apr. 2013).
Flynn et al., "High Efficiency Video Coding (HEVC) Range Extensions text specification: Draft 6," JCTVC-P1005_v1, 355 pp. (Jan. 2014).
Gaikar, "Techinline Remote Desktop Software: Access Your Computers Remotely," Tricks Machine, 6 pp. (Jan. 2012).
ISO/IEC 11172-2, "Information technology—Coding of moving pictures and associated audio for digital storage media at up to about 1,5 Mbit/s—Part 2: Video," 122 pp. (Aug. 1993).
ISO/IEC 14496-2, "Information Technology—Coding of Audio-Visual Objects: Visual," ISO/IEC JTC1/SC29/WG11 N2202, 327 pp. (Mar. 1998).
ITU-T Recommendation H.261, "Video Codec for Audiovisual Services at p x 64 kbits," 29 pp. (Mar. 1993).
ITU-T Recommendation H.262, "Generic Coding of Moving Pictures and Associated Audio Information: Video," 218 pp. (Jul. 1995).
ITU-T Recommendation H.263, "Video coding for low bit rate communication," 167 pp. (Feb. 1998).
ITU-T Recommendation H.264, "Advanced video coding for generic audiovisual services," 680 pp. (Jan. 2012).
ITU-T Recommendation H.265, "High efficiency video coding," 317 pp. (Apr. 2013).
Kwon et al., "AHG5: Fast encoding using early skipping of Intra block copy (IntraBC) search," JCTVC-O0245, 9 pp. (Oct. 2013).
Li et al., "Description of screen content coding technology proposal by Microsoft," JCTVC-Q0035, 27 pp. (Mar. 2014).
Li et al., "Hash-based intraBC search," JCTVC-Q0252, 2 pp. (Mar. 2014).
Li et al., "Hash-based motion search," JCTVC-Q0245, 5 pp. (Mar. 2014).
Li et al., "Low complexity encoders for JCTVC-Q0035," JCTVC-Q0052, 4 pp. (Mar. 2014).
Praveen et al., "Analysis and Approximation of SAO Estimation for CTU-Level HEVC Encoder," Proc. Of Visual Communications and Image Processing, 5 pp. (Nov. 2013).
Rane, "Hash-Aided Motion Estimation and Rate Control for Distributed Video Coding," EE392J Project Report, 10 pp. (Dec. 2004).
Robert et al., "Improving Intra mode coding in H.264/AVC through block oriented transforms," IEEE 8th Workshop on Multimedia Signal Processing, 5 pp. (Oct. 2006).
Sangi et al., "Global Motion Estimation Using Block Matching with Uncertainty Analysis," Signal Processing Conference, pp. 1823-1827 (Sep. 2007).
Shah et al., "HD Resolution Intra Prediction Architecture for H.264 Decoder," IEEE Int'l Conf. on VLSI Design, pp. 107-112 (Jan. 2012).
SMPTE Standard, "VC-1 Compressed Video Bitstream Format and Decoding Process," SMPTE 421M-2006, 493 pp. (Feb. 2006).
Sun et al., "Motion-Embedded Residual Error for Packet Loss Recovery of Video Transmission and Encryption," Visual Communications and Image Processing, vol. 6077, 14 pp. (Jan. 2006).
Tagliasacchi et al., "Hash-Based Motion Modeling in Wyner-Ziv Video Coding," IEEE Int'l Conf. on Acoustics, Speech, and Signal Processing, 4 pp. (Apr. 2007).
Wu et al., "Linear Hashtable Method Predicted Hexagonal Search Algorithm with Spatial Related Criterion," Lecture Notes in Computer Science, pp. 1208-1217 (Jun. 2005).
Yang et al., "MyFinder: Near-Duplicate Detection for Large Image Collections," ACM Int'l Conf. on Multimedia, pp. 1013-1014 (Oct. 2009).
Yu et al., "New Intra Prediction using Intra-Macroblock Motion Compensation," JVT-C151, 10 pp. (May 2002).
Zhu et al., "2-D Dictionary Based Video Coding for Screen Contents," Data Compression Conf., pp. 43-52 (Mar. 2014).
Zhu et al., "Screen content coding using 2-D dictionary mode," JCTVC-O0355, 4 pp. (Oct. 2013).
Zhu et al., "Screen content coding using 2-D dictionary mode," JCTVC-O0357, 4 pp. (Oct. 2013).
"Non Final Office Action Issued in U.S. Appl. No. 15/029,589", dated Mar. 12, 2019, 79 Pages.
"Third Office Action Issued in Chinese Patent Application No. 201480030627.X", dated Mar. 13, 2019, 6 Pages.
International Search Report and Written Opinion, International Application No. PCT/CN2014/087869, 12 pages, dated Jul. 1, 2015.
"Search Report Issued in European Patent Application No. 14903205.4", dated Jan. 29, 2018, 9 Pages.
Li, et al., "Adaptive Motion Vector Resolution for Screen Content", In 18th Meeting of Joint Collaborative Team on Video Coding (JCT-VC) of ITU-T SG16 WP3 and ISO/IEC JTC1/SC29/WG11, JCTVC-R0106 r1, Jun. 30, 2014,16 Pages.
Chum, et al., "Scalable Near Identical Image and Shot Detection", In Proceedings of International Conference on Image and Video Retrieval, Jul. 9, 2007, pp. 549-556.
Gargi, et al.,"Performance Characterization of Video-Shot-Change Detection Methods", In IEEE Transactions on Circuits and Systems for Video Technology, vol. 10, Issue 1, Feb. 1, 2000, 13 Pages.
"Office Action Issued in European Patent Application No. 14903205.4", dated Feb. 16, 2018, 11 Pages.
"Wikipedia: Locality-sensitive hashing", Retrieved from https://web.archive.org/web/20130503140110/https://en.wikipedia.org/wiki/Locality-sensitive_hashing, May 3, 2013, 6 Pages.
"Office Action issued in European Patent Application No. 13895864.0", dated May 24, 2018, 5 Pages.
"Office Action Issued in European Patent Application No. 13895864.0", dated Apr. 5, 2017, 4 Pages.
"Office Action Issued in European Patent Application No. 13895864.0", dated Aug. 25, 2016, 7 Pages.
"Office Action Issued in European Patent Application No. 13895864.0", dated Jan. 10, 2018, 4 Pages.
"Supplementary Search Report Issued in European Patent Application No. 13895864.0", dated Jul. 5, 2016, 4 Pages.
"Office Action Issued in European Patent Application No. 13896175.0", dated Sep. 29, 2016, 8 Pages.
"Office Action issued in European Patent Application No. 13896175.0", dated Apr. 4, 2018, 6 Pages.
"Search Report Issued in European Patent Application No. 13896175.0", dated Sep. 14, 2016, 6 Pages.
"Office Action Issued in European Patent Application No. 14884278.4", dated May 31, 2017, 3 Pages.
"Office Action Issued in European Application No. 14884278.4", dated Feb. 8, 2017, 5 Pages.
"Search Report Issued in European Application No. 14884278.4", dated Jan. 31, 2017, 4 Pages.
"Office Action Issued in European Patent Application No. 14885049.8", dated Jun. 14, 2017, 7 Pages.
"Office Action Issued in European Patent Application No. 14885049.8", dated Oct. 26, 2017, 4 Pages.
"Search Report Issued in European Patent Application No. 14885049.8", dated May 18, 2017, 6 Pages.
"Office Action Issued in European Patent Application No. 14895767.3", dated Jul. 6, 2017, 8 Pages.
"Office Action Issued in European Patent Application No. 14895767.3", dated Mar. 15, 2018, 5 Pages.
"Supplementary Search Report Issued in European Patent Application No. 14895767.3", dated Jun. 14, 2017, 5 Pages.
"First Office Action and Search Report Issued in Chinese Patent Application No. 201380080482.X", dated Jun. 2, 2017, 15 Pages.
"Second Office Action Issued in Chinese Patent Application No. 201380080482.X", dated Jan. 4, 2018, 9 Pages.

(56) References Cited

OTHER PUBLICATIONS

"Office Action and Search Report Issued in Chinese Patent Application No. 201380080483.4", dated Mar. 20, 2018, 12 Pages.
"First Office Action and Search Report Issued in Chinese Patent Application No. 201480029780.0", dated Feb. 5, 2018, 14 Pages.
"First Office Action and Search Report Issued in Chinese Patent Application No. 201480030627.X", dated Jan. 17, 2018, 15 Pages.
Li, et al., "RDPCM operation unification and cleanup", In 15th Meeting Joint Collaborative Team on Video Coding (JCT-VC) of ITU-T SG 16 WP 3 and ISO/IEC JTC 1/SC 29/WG 11, JCTVC-O0185, Oct. 23, 2013, 6 Pages.
"International Search Report and Written Opinion Issued in PCT Application No. PCT/CN2013/085937", dated Jun. 10, 2014, 12 Pages.
"International Search Report and Written Opinion Issued in PCT Application No. PCT/CN2013/085939", dated Jul. 30, 2014, 12 Pages.
"International Search Report & Written Opinion Issued in PCT Application No. PCT/CN2014/072827", dated Dec. 10, 2014, 12 Pages.
"International Search Report and Written Opinion Issued in PCT Application No. PCT/CN2014/072834", dated Dec. 3, 2014, 13 Pages.
Riguer, et al., "Real-Time Depth of Field Simulation", In ShaderX2: Shader Programming Tips and Tricks with DirectX 9, Jan. 1, 2003, 30 Pages.
"International Search Report and Written Opinion Issued in PCT Patent Application No. PCT/CN2014/080481", dated Mar. 2, 2015, 13 Pages.
"International Search Report and Written Opinion Issued in PCT Application No. PCT/US2017/057066", dated Jan. 24, 2018, 12 Pages.
"Notice of Reasons for Rejection issued in Japanese Patent Application No. 2017-517045," dated Jun. 26, 2018, 3 pages.
Brasnett et al., "Comments & Results on MPEG-7 Image Signature," MPEG2008/M15863, 4 pp. (Oct. 2008).
Li et al., "A Unified Framework of Hash-based Matching for Screen Content Coding," IEEE VCIP, pp. 530-533 (Dec. 2014).
Monga et al, "Perceptual Image Hashing Via Feature Points: Performance Evaluation and Tradeoffs," IEEE Transactions Image Processing, pp. 3452-3465 (Nov. 2006).
Pauleve et al., "Locality Sensitive Hashing: A Comparison of Hash Function Types and Querying Mechanisms," Pattern Recognition Letters, vol. 31, No. 11, pp. 1348-1358 (Aug. 2010).
Rapaka et al., "Improved Intra Block Copy and Motion Search Methods for Screen Content Coding," Visual Communications and Image Procsesing, vol. 9599, pp. (Sep. 2015).
Wikipedia, "Locality-sensitive Hashing" 6 pp. (document marked: "last modified on Apr. 18, 2013").
Wikipedia, "Locality-sensitive Hashing" 7 pp. (document marked: "last edited on Feb. 6, 2018").
"First Office Action issued in Chinese Patent Application No. 201480071892.2," dated Jul. 19, 2018, 6 pages.
"International Preliminary Report on Patentability Issued in International Application No. PCT/CN2014/087869," dated Apr. 13, 2017, 6 pages.
"Non Final Office Action Issued in U.S. Appl. No. 15/024,816", dated Sep. 28, 2017, 45 Pages.
"Non Final Office Action Issued in U.S. Appl. No. 15/024,816", dated Oct. 2, 2017, 44 Pages.
"Non Final Office Action Issued in U.S. Appl. No. 15/321,536", dated Oct. 13, 2017, 52 Pages.
"Second Office Action Issued in Chinese Patent Application No. 201480048046.9", dated Jan. 23, 2019, 6 Pages.
"Examination Report No. 1 Issued in Australian Patent Application No. 2014408223," dated Mar. 14, 2019, 4 Pages.
"Non Final Office Action Issued in U.S. Appl. No. 15/024,812", dated Oct. 4, 2017, 75 Pages.
"Non Final Office Action Issued in U.S. Appl. No. 15/024,816", dated Oct. 1, 2018, 59 Pages.
"Non Final Office Action Issued in U.S. Appl. No. 15/029,585", dated Oct. 19, 2018, 49 Pages.
"Non Final Office Action Issued in U.S. Appl. No. 15/029,585", dated Nov. 6, 2017, 51 Pages.
"Final Office Action Issued in U.S. Appl. No. 15/029,589", dated Nov. 21, 2018, 50 Pages.
"Non Final Office Action Issued in U.S. Appl. No. 15/321,536", dated Oct. 9, 2018, 65 Pages.
"Extended Search Report Issued in European Patent Application No. 18176304.6", dated Sep. 27, 2018, 8 Pages.
"Second Office Action Issued in Chinese Patent Application No. 201380080483.4", dated Nov. 29, 2018, 6 Pages.
"Second Office Action Issued in Chinese Patent Application No. 201480029780.0", dated Oct. 29, 2018, 13 Pages.
"Second Office Action Issued in Chinese Patent Application No. 201480030627.X", dated Sep. 29, 2018, 13 Pages.
Zhenyu, et al., "Motion Feature and Hadamard Coefficient-Based Fast Multiple Reference Frame Motion Estimation for H.264", In Journal of IEEE Transactions on Circuits and Systems for Video Technology, vol. 18, No. 5, May 2008, 13 Pages.
"Second Office Action Issued in Australian Patent Application No. 2014408223", dated Jun. 3, 2019, 3 Pages.
"Office Action Issued in Mexican Patent Application No. MX/a/2017/004210", dated Sep. 17, 2019, 05 Pages.
"Extended European Search Report Issued in European Patent Application No. 19182387.1", dated Nov. 28, 2019, 12 Pages.
"Office Action Issued in Korean Patent Application No. 10-2016-7027484", dated Mar. 25, 2020, 17 Pages.
"Office Action Issued in Korean Patent Application No. 10-2016-7013774", dated Feb. 13, 2020, 11 Pages.
"Office Action Issued in Indian Patent Application No. 201647011539", dated Feb. 18, 2020, 6 Pages.
"Final Office Action Issued in U.S. Appl. No. 15/365,927", dated Feb. 26, 2020, 18 Pages.
"Office Action Issued in Mexican Patent Application No. MX/a/2017/004210", dated Feb. 27, 2020, 6 Pages.
"Office Action Issued in Indian Patent Application No. 201747008172", dated Jul. 10, 2020, 7 Pages.
"Office Action Issued in Brazilian Patent Application No. BR112017004490-0", dated Jun. 28, 2020, 5 Pages.
"Office Action Issued in Indian Patent Application No. 201647028907", dated Jul. 22, 2020, 6 Pages.
"Advisory Action Issued in U.S. Appl. No. 15/365,927", dated Jun. 5, 2020, 3 Pages.
"Office Action Issued in Mexican Patent Application No. MX/a/2017/004210", dated Sep. 21, 2020, 6 Pages.
"Office Action Issued in Korean Patent Application No. 10-2017-7011764", dated Sep. 16, 2020, 11 Pages.
"Office Action Issued in Indian Patent Application No. 201647043576", dated Sep. 20, 2020, 7 Pages.
"Non Final Office Action Issued in U.S. Appl. No. 15/365,927", dated Dec. 24, 2020, 6 Pages.
"Office Action Issued in Canadian Patent Application No. 2961089", dated Nov. 6, 2020, 3 Pages.
"Office Action Issued in Korean Patent Application No. 10-2017-7002065", dated Feb. 19, 2021, 06 Pages.
"Office Action Issued in Korean Patent Application No. 10-2017-7011764", dated Mar. 25, 2021, 14 Pages.

* cited by examiner software 180 implementing one or more innovations for encoder decision-making based on results of hash-based block matching

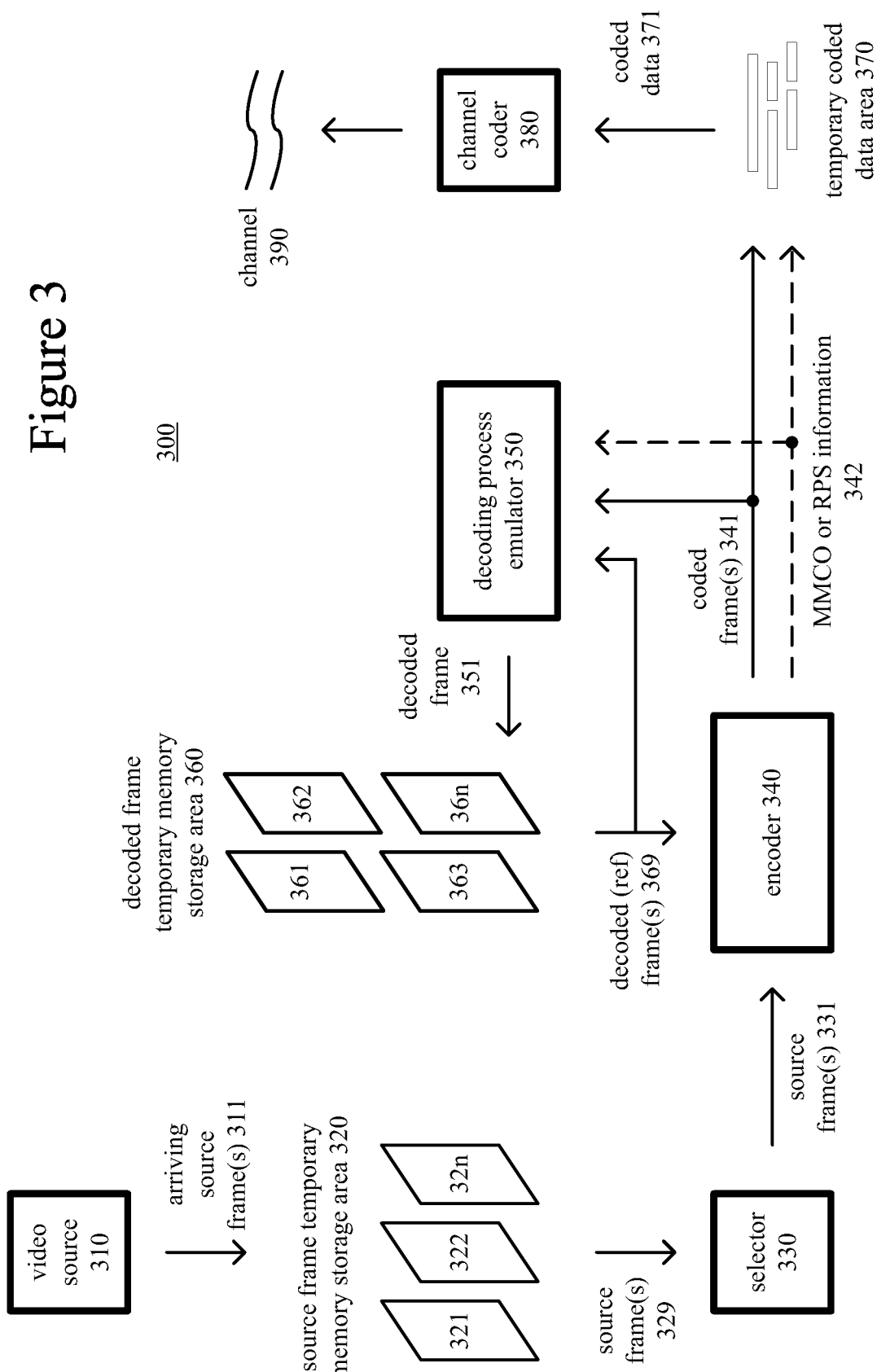

400 computer desktop environment (510) with content that
may provide input for screen capture composite video (620) with natural video
content and palette-based content

Figure 7    700    $h(B_{current}) = h_3$ $h_0$:  $B(1266, 263), B(1357, 365), B(1429, 401), B(502, 464), \ldots$ $h_1$:  $B(1704, 154), B(1709, 177), B(1158, 242)$ $h_2$:  $B(1321, 49), B(145, 182), B(599, 490), B(1668, 511), \ldots$ $h_3$:  $B(569, 73), B(1293, 102), B(401, 290), B(455, 306), \ldots$ $h_4$:  $B(1119, 46)$ $h_5$:  $B(1381, 11), B(1676, 53), B(38, 119), B(1633, 184), \ldots$ $h_6$:  $B(979, 85), B(1013, 177), B(575, 470), B(900, 477), \ldots$

.
.
.

$h_{n-1}$:  $B(794, 14), B(1479, 17), B(19, 317), B(1338, 374), \ldots$

Figure 8a      800

$h_0$ :   entry(0, 0), entry(0, 1), entry(0, 2), entry(0, 3), . . .

$h_1$ :   entry(1, 0), entry(1, 1), entry(1, 2), entry(1, 3), . . .

$h_2$ :

$h_3$ :   entry(3, 0), entry(3, 1), entry(3, 2), entry(3, 3)

$h_4$ :   entry(4, 0), entry(4, 1), entry(4, 2), entry(4, 3), . . .

$h_5$ :   entry(5, 0), entry(5, 1), entry(5, 2), entry(5, 3), . . .

$h_6$ :   entry(6, 0), entry(6, 1)

.
.
.

$h_{n-1}$ :   entry(n-1, 0), entry(n-1, 1), entry(n-1, 2), entry(n-1, 3), . . .

Figure 8b      810

$entry(h_i, k)$ :   address of $B$

Figure 8c      820

$entry(h_i, k)$ :   address of $B$ and hash value $h'(B)$ from $2^{nd}$ hash function $h'()$

Figure 9a  900

$h(B_{current}) = h_2$ $h_0$:    $h'_0$ list, $h'_1$ list, $h'_2$ list, $h'_3$ list, . . .

$h_1$:    $h'_0$ list, $h'_1$ list, $h'_2$ list, $h'_3$ list, . . .

$\boxed{h_2: \quad h'_0 \text{ list}, h'_1 \text{ list}, h'_2 \text{ list}, h'_3 \text{ list}, \ldots}$ $h_3$:    $h'_0$ list, $h'_1$ list, $h'_2$ list, $h'_3$ list, . . .

.
.
.

$h_{n1-1}$:    $h'_0$ list, $h'_1$ list, $h'_2$ list, $h'_3$ list, . . .

Figure 9b  910

$h'(B_{current}) = h'_0$ $\boxed{h'_0: \quad entry(0, 0), entry(0, 1), entry(0, 2), entry(0, 3), \ldots}$ $h'_1$:    $entry(1, 0), entry(1, 1), entry(1, 2), entry(1, 3), \ldots$ $h'_2$:

$h'_3$:    $entry(3, 0), entry(3, 1), entry(3, 2), entry(3, 3)$

.
.
.

$h'_{n2-1}$:    $entry(n2-1, 0), entry(n2-1, 1), entry(n2-1, 2), \ldots$

Figure 9c  920

$entry(h'_i, k)$:    address of $B$ block (1000) with uniform sample values block (1010) whose rows each have uniform sample values block (1020) whose columns each have uniform sample values

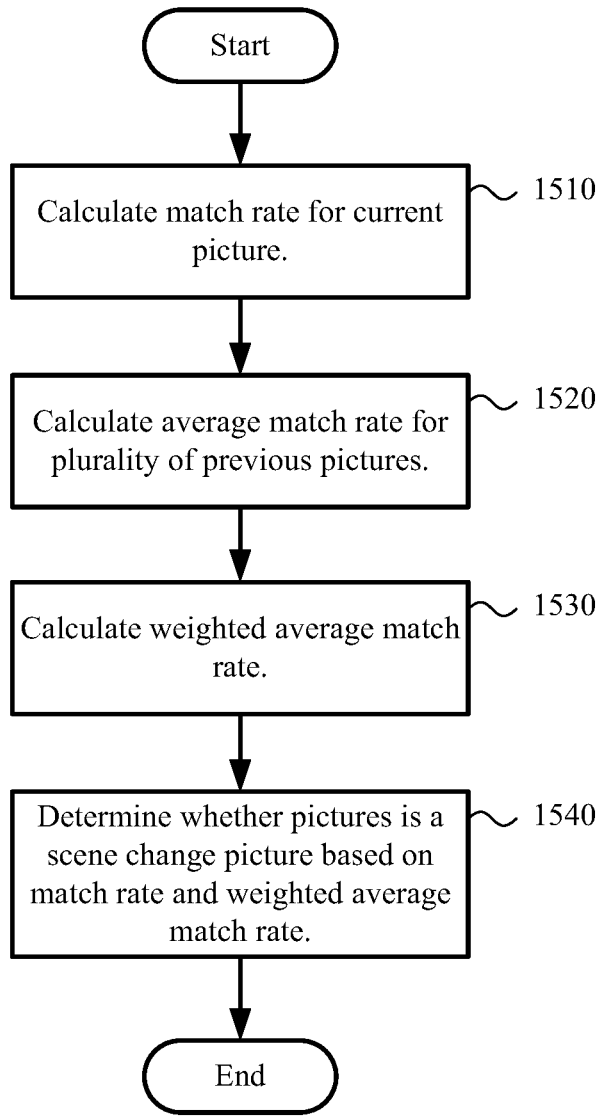

HASH-BASED ENCODER DECISIONS FOR VIDEO CODING

CROSS REFERENCE TO RELATED APPLICATIONS

This is the U.S. National Stage of International Application No. PCT/CN2014/087869, filed Sep. 30, 2014, which was published in English under PCT Article 21(2), and which is incorporated herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

In general, video compression techniques include "intra-picture" compression and "inter-picture" compression. Intra-picture compression techniques compress individual pictures, and inter-picture compression techniques compress pictures with reference to a preceding and/or following picture (often called a reference or anchor picture) or pictures.

Inter-picture compression techniques often use motion estimation and motion compensation to reduce bit rate by exploiting temporal redundancy in a video sequence. Motion estimation is a process for estimating motion between pictures. In one common technique, an encoder using motion estimation attempts to match a current block of sample values in a current picture with a candidate block of the same size in a search area in another picture, the reference picture. A reference picture is, in general, a picture that contains sample values that may be used for prediction in the decoding process of other pictures.

For a current block, when the encoder finds an exact or "close enough" match in the search area in the reference picture, the encoder parameterizes the change in position between the current and candidate blocks as motion data such as a motion vector ("MV"). An MV is conventionally a two-dimensional value, having a horizontal MV component that indicates left or right spatial displacement and a vertical MV component that indicates up or down spatial displacement. In general, motion compensation is a process of reconstructing pictures from reference picture(s) using motion data.

In some encoding techniques, blocks of a current picture are matched with blocks of one or more reference pictures. However, such matching techniques can suffer decreased performance when a large number of blocks need to be stored or matched. In other encoding techniques, motion vector precision can be changed (e.g., on a picture-by-picture basis), but deciding when to change motion vector precision can be a difficult task. In yet other encoding techniques, scene change detection is performed. However, such detection techniques may not efficiently or accurately detect scene changes involving screen content.

SUMMARY

In summary, the detailed description presents innovations in encoder-side decisions that use the results of hash-based block matching in performing various tasks and operations during encoding. For example, some of the innovations relate to ways of building hash tables that include some (but not all) uniform blocks. Other innovations relate to determining motion vector resolution based on hash-based block matching. For example, blocks of a picture can be classified into a plurality of categories and the number of blocks assigned to each category can be used in determining which motion vector precision to use. Other innovations relate scene change detection using, at least in part, hash-based block matching information. For example, pictures can be identified at various stages of a scene change (e.g., during a stable scene, just before a scene change, during a scene transition, and at the start of a new scene). Scene change information can be used in selecting long-term reference pictures and/or when adjusting quality of pictures during encoding.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 7 is a table illustrating hash values for candidate blocks in hash-based block matching.

FIGS. 8a-8c are tables illustrating example data structures that organize candidate blocks for hash-based block matching.

FIGS. 9a-9c are tables illustrating example data structures that organize candidate blocks for iterative hash-based block matching.

FIG. 15 is a flowchart illustrating a technique for detecting a scene change during video encoding.

DETAILED DESCRIPTION

Figure 1:
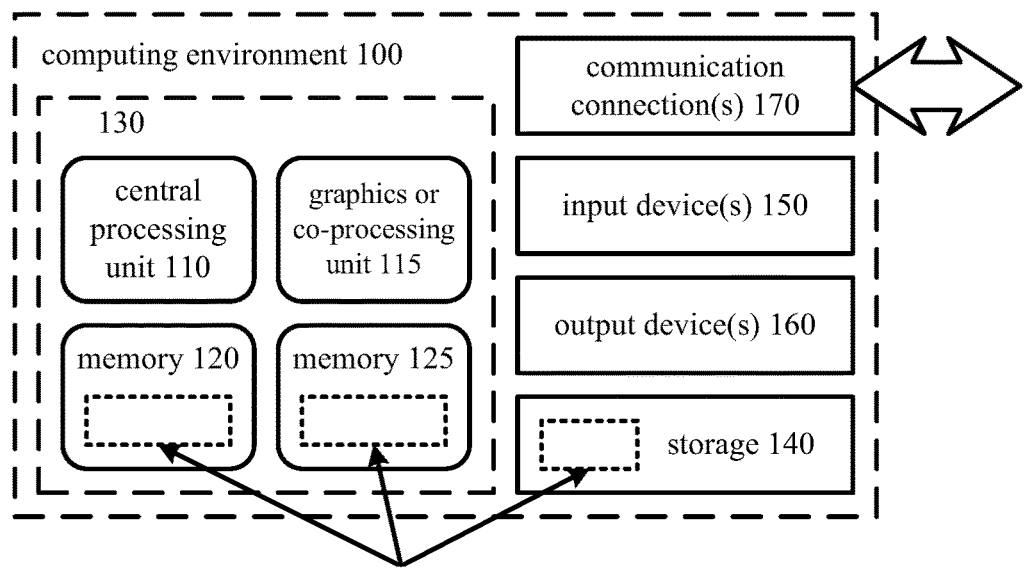
FIG. 1 is a diagram of an example computing system in which some described embodiments can be implemented.

The detailed description presents innovations in encoder-side decisions that use hash-based matching techniques to improve performance of various types of operations. For example, some of the innovations relate to ways of building hash tables that include some (but not all) uniform blocks (e.g., that include only those homogeneous bocks that satisfy a selection criteria). Other innovations relate to determining motion vector resolution based on hash-based block matching. For example, blocks of a picture can be classified into a plurality of categories and the number of blocks assigned to each category can be used in determining which motion vector precision to use. Other innovations relate scene change detection using, at least in part, hash-based block matching information. For example, pictures can be identified at various stages of a scene change (e.g., during a stable scene, just before a scene change, during a scene transition, and at the start of a new scene). Scene change information can be used in selecting long-term reference pictures and/or when adjusting quality of pictures during encoding.

In particular, the innovations can provide computationally-efficient ways to set parameters during encoding of artificially-created video content such as screen capture content.

Although operations described herein are in places described as being performed by a video encoder, in many cases the operations can be performed by another type of media processing tool (e.g., image encoder).

Some of the innovations described herein are illustrated with reference to syntax elements and operations specific to the H.265/HEVC standard. For example, reference is made to the draft version JCTVC-P1005 of the H.265/HEVC standard—"High Efficiency Video Coding (HEVC) Range Extensions Text Specification: Draft 6," JCTVC-P1005_v1, February 2014. The innovations described herein can also be implemented for other standards or formats.

Many of the innovations described herein can improve decision-making processes when encoding certain artificially-created video content such as screen capture content from a screen capture module. Screen capture content typically includes repeated structures (e.g., graphics, text characters). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen capture content include remote desktop conferencing and encoding/decoding of graphical overlays on natural video or other "mixed-content" video. These innovations can also be used for natural video content, but may not be as effective.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoder decisions based on the results of hash-based block matching (e.g., for building hash tables, for selecting MV precision, and for detecting scene changes and making decisions based on scene changes), in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for encoder decisions based on the results of hash-based block matching.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable storage media. Computer-readable storage media are any available tangible media that can be accessed within a computing environment. By way of example, with the computing system (100) computer-readable media include memory (120, 125) and/or storage (140. The term computer-readable storage media does not include signals and carrier waves. In addition, the term computer-readable storage media does not include communication connections (e.g., 170).

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
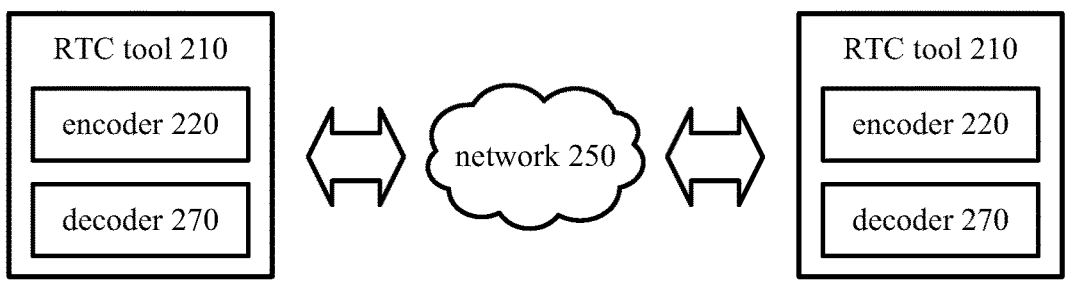
FIGS. 2a and 2b are diagrams of example network environments in which some described embodiments can be implemented.
Figure 2B:

FIGS. 2*a* and 2*b* show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2*a*, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-part communication scenario. Although the network environment (201) in FIG. 2*a* includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270).

In the network environment (202) shown in FIG. 2*b*, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2*b* includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using encoder-side decisions as described herein.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format, GBR 4:4:4 format or BGR 4:4:4 format).

The encoder (340) encodes the selected frame (331) to produce a coded frame (341) and also produces memory management control operation ("MMCO") signals (342) or reference picture set ("RPS") information. The RPS is the set of frames that may be used for reference in motion compensation for a current frame or any subsequent frame. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area. Example ways to make decisions about which reference pictures to retain in an RPS are described below.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of sample values for purposes of encoding and decoding.

For syntax according to the H.265/HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×4 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, prediction unit, residual data unit, or a CB, PB or TB, or some other set of sample values, depending on context.

Returning to FIG. 3, the encoder represents an intra-coded block of a source frame (331) in terms of prediction from other, previously reconstructed sample values in the frame (331). For intra block copy ("BC") prediction, an intra-picture estimator or motion estimator estimates displacement of a block with respect to the other, previously reconstructed sample values in the same frame. An intra-frame prediction reference region is a region of sample values in the frame that are used to generate BC-prediction values for the block. The intra-frame prediction region can be indicated with a block vector ("BV") value, which can be represented in the bitstream as a motion vector ("MV") value. For intra spatial prediction for a block, the intra-picture estimator estimates extrapolation of the neighboring reconstructed sample values into the block. Prediction information (such as BV/MV values for intra BC prediction, or prediction mode (direction) for intra spatial prediction) can be entropy coded and output. An intra-frame prediction predictor (or motion compensator for BV/MV values) applies the prediction information to determine intra prediction values.

The encoder (340) represents an inter-frame coded, predicted block of a source frame (331) in terms of prediction from one or more reference frames (369). A motion estimator estimates the motion of the block with respect to the one or more reference frames (369). The motion estimator can select an MV precision (e.g., integer-sample MV precision, ½-sample MV precision, or ¼-sample MV precision), for example, using an approach described herein, then use the selected MV precision during motion estimation. When multiple reference frames are used, the multiple reference frames can be from different temporal directions or the same temporal direction. A motion-compensated prediction reference region is a region of sample values in the reference frame(s) that are used to generate motion-compensated prediction values for a block of sample values of a current frame. The motion estimator outputs motion information such as MV information, which is entropy coded. A motion compensator applies MVs to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, selected MV precision, SAO filtering parameters, RPS update information, QP values, mode decisions, other parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or SAO filtering) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. A SPS is typically signaled separate from other data for the sequence, and a syntax element in the other data indicates which SPS to use.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, ..., 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Video Encoders

Figure 4A:
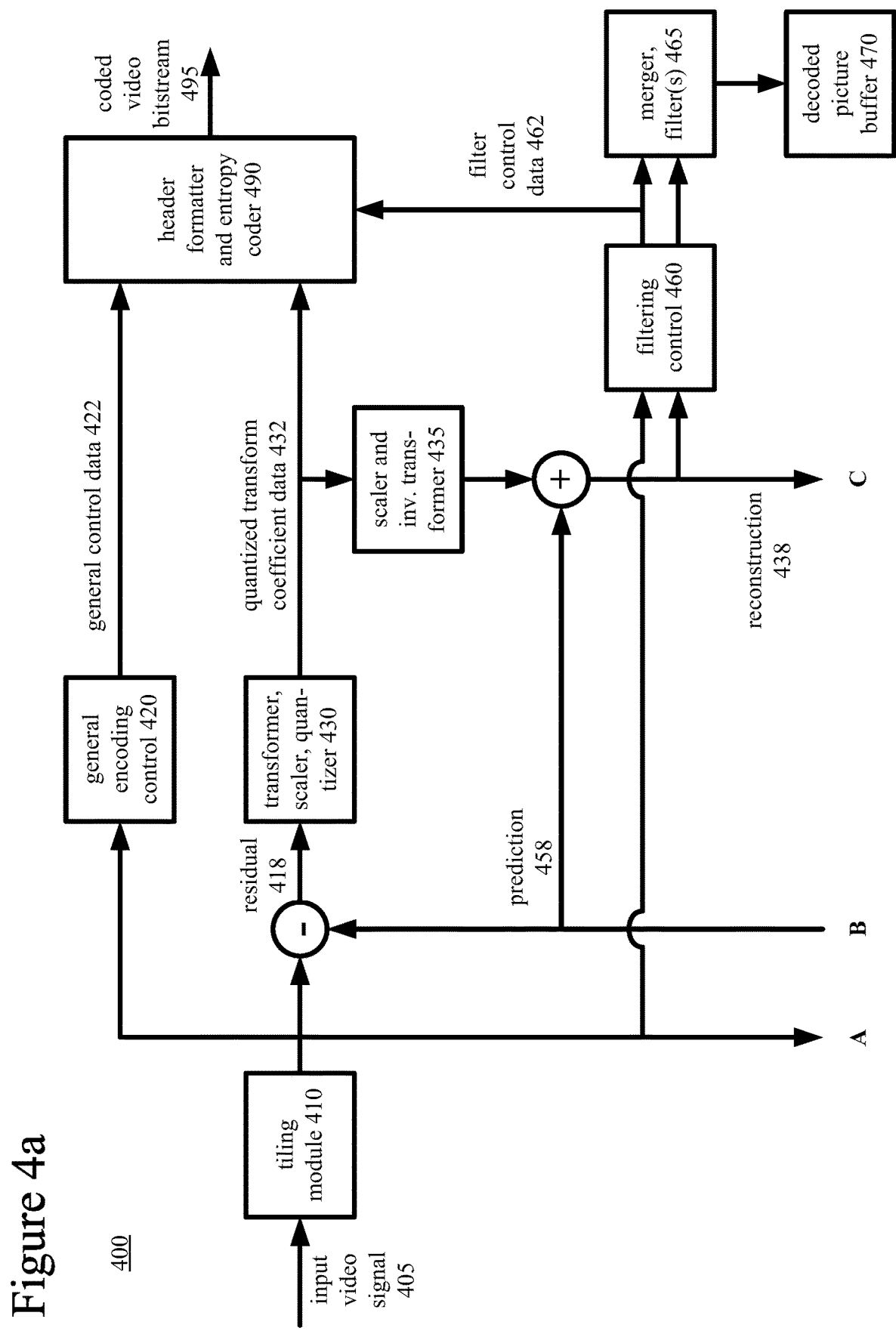
FIGS. 4a and 4b are diagrams illustrating an example video encoder in conjunction with which some described embodiments can be implemented.
Figure 4B:
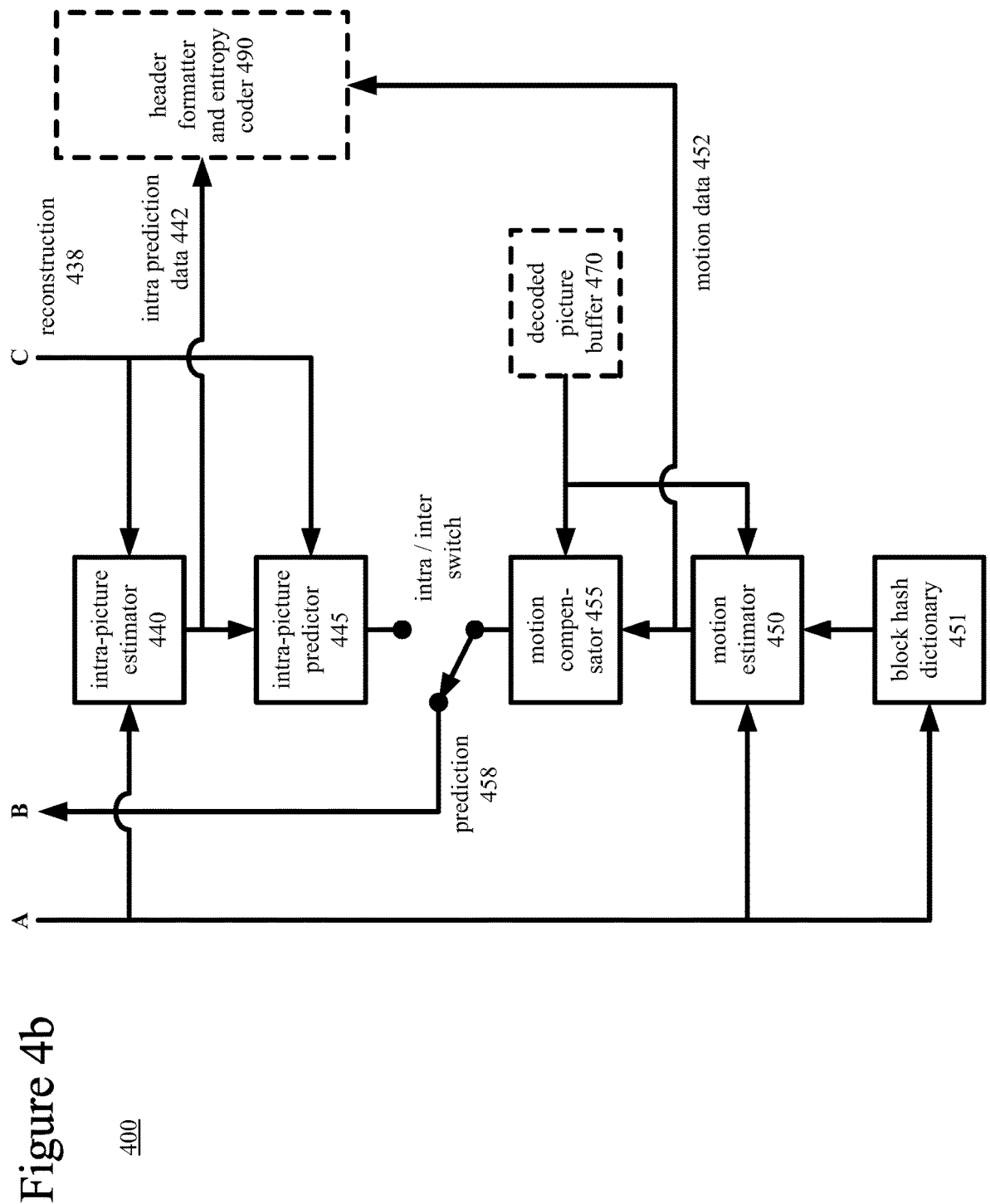

FIGS. 4a and 4b are a block diagram of a generalized video encoder (400) in conjunction with which some described embodiments may be implemented. The encoder (400) receives a sequence of video pictures including a current picture as an input video signal (405) and produces encoded data in a coded video bitstream (495) as output.

The encoder (400) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TB s).

The encoder (400) compresses pictures using intra-picture coding and/or inter-picture coding. Many of the components of the encoder (400) are used for both intra-picture coding and inter-picture coding. The exact operations performed by those components can vary depending on the type of information being compressed.

A tiling module (410) optionally partitions a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. In H.265/HEVC implementations, the encoder (400) partitions a picture into one or more slices, where each slice includes one or more slice segments.

The general encoding control (420) receives pictures for the input video signal (405) as well as feedback (not shown) from various modules of the encoder (400). Overall, the general encoding control (420) provides control signals (not shown) to other modules (such as the tiling module (410), transformer/scaler/quantizer (430), scaler/inverse transformer (435), intra-picture estimator (440), motion estimator (450), filtering control (460) and intra/inter switch) to set and change coding parameters during encoding. For example, during encoding the general encoding control (420) can manage decisions about hash table creation, MV precision, and which reference pictures to retain in an RPS. The general encoding control (420) can also evaluate intermediate results during encoding, for example, performing rate-distortion analysis. The general encoding control (420) produces general control data (422) that indicates decisions made during encoding, so that a corresponding decoder can make consistent decisions. The general control data (422) is provided to the header formatter/entropy coder (490).

If the current picture is predicted using inter-picture prediction, a motion estimator (450) estimates the motion of blocks of sample values of a current picture of the input video signal (405) with respect to one or more reference pictures. The decoded picture buffer ("DPB") (470) buffers one or more reconstructed previously coded pictures for use as reference pictures. When multiple reference pictures are used, the multiple reference pictures can be from different temporal directions or the same temporal direction.

Working with the general encoding control (420) and a block hash dictionary (451), the motion estimator (450) can select an MV precision (e.g., integer-sample MV precision, ½-sample MV precision, or ¼-sample MV precision) using an approach described herein, then use the selected MV precision during motion estimation. For hash-based block matching during the motion estimation, the motion estimator (450) can use the block hash dictionary (451) to find an MV value for a current block. The block hash dictionary (451) is a data structure that organizes candidate blocks for hash-based block matching. The block hash dictionary (451) is an example of a hash table. In FIG. 4b, the block hash dictionary (451) is constructed based upon input sample values. Alternatively, a block hash dictionary can be constructed based upon reconstructed sample values and updated during encoding to store information about new candidate blocks, as those candidate blocks become available for use in hash-based block matching.

The motion estimator (450) produces as side information motion data (452) such as MV data, merge mode index values, and reference picture selection data, and the selected MV precision. These are provided to the header formatter/entropy coder (490) as well as the motion compensator (455).

The motion compensator (455) applies MVs to the reconstructed reference picture(s) from the DPB (470). The motion compensator (455) produces motion-compensated predictions for the current picture.

In a separate path within the encoder (400), an intra-picture estimator (440) determines how to perform intra-picture prediction for blocks of sample values of a current picture of the input video signal (405). The current picture can be entirely or partially coded using intra-picture coding. Using values of a reconstruction (438) of the current picture, for intra spatial prediction, the intra-picture estimator (440) determines how to spatially predict sample values of a current block of the current picture from neighboring, previously reconstructed sample values of the current picture. The intra-picture estimator (440) can determine the direction of spatial prediction to use for a current block.

Or, for intra BC prediction using BV/MV values, the intra-picture estimator (440) or motion estimator (450) estimates displacement of the sample values of the current block to different candidate reference regions within the current picture, as a reference picture. For hash-based block matching, the intra-picture estimator (440) or motion estimator (450) can use a block hash dictionary (not shown) to find a BV/MV value for a current block. Or, for an intra-picture dictionary coding mode, pixels of a block are encoded using previous sample values stored in a dictionary or other location, where a pixel is a set of co-located sample values (e.g., an RGB triplet or YUV triplet).

The intra-picture estimator (440) produces as side information intra prediction data (442), such as mode information, prediction mode direction (for intra spatial prediction), and offsets and lengths (for dictionary mode). The intra prediction data (442) is provided to the header formatter/entropy coder (490) as well as the intra-picture predictor (445).

According to the intra prediction data (442), the intra-picture predictor (445) spatially predicts sample values of a current block of the current picture from neighboring, previously reconstructed sample values of the current picture. Or, for intra BC prediction, the intra-picture predictor (445) or motion compensator (455) predicts the sample values of the current block using previously reconstructed sample values of an intra-picture prediction reference region, which is indicated by a BV/MV value for the current block. Or, for intra-picture dictionary mode, the intra-picture predictor (445) reconstructs pixels using offsets and lengths.

The intra/inter switch selects whether the prediction (458) for a given block will be a motion-compensated prediction or intra-picture prediction.

The difference (if any) between a block of the prediction (458) and a corresponding part of the original current picture of the input video signal (405) provides values of the residual (418), for a non-skip-mode block. During reconstruction of the current picture, for a non-skip-mode block, reconstructed residual values are combined with the prediction (458) to produce an approximate or exact reconstruction (438) of the original content from the video signal (405). (In lossy compression, some information is lost from the video signal (405).)

In the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (458) is null), producing blocks of frequency transform coefficients. The transformer/scaler/quantizer (430) can apply a transform with variable block sizes. The encoder (400) can also skip the transform step in some cases.

The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. The quantized transform coefficient data (432) is provided to the header formatter/entropy coder (490).

In the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. For a non-skip-mode block, the encoder (400) combines reconstructed residual values with values of the prediction (458) (e.g., motion-compensated prediction values, intra-picture prediction values) to form the reconstruction (438). For a skip-mode block or dictionary-mode block, the encoder (400) uses the values of the prediction (458) as the reconstruction (438).

For spatial intra-picture prediction, the values of the reconstruction (438) can be fed back to the intra-picture estimator (440) and intra-picture predictor (445). For intra BC prediction, the values of the reconstruction (438) can similarly be fed back to provide reconstructed sample values. Also, the values of the reconstruction (438) can be used for motion-compensated prediction of subsequent pictures.

The values of the reconstruction (438) can be further filtered. A filtering control (460) determines how to perform deblock filtering on values of the reconstruction (438), for a given picture of the video signal (405). The filtering control (460) produces filter control data (462), which is provided to the header formatter/entropy coder (490) and merger/filter(s) (465).

In the merger/filter(s) (465), the encoder (400) merges content from different tiles into a reconstructed version of the picture. The encoder (400) selectively performs deblock filtering according to the filter control data (462). Other filtering (such as de-ringing filtering or ALF) can alternatively or additionally be applied. Tile boundaries can be selectively filtered or not filtered at all, depending on settings of the encoder (400), and the encoder (400) may provide syntax within the coded bitstream to indicate whether or not such filtering was applied.

The DPB (470) buffers the reconstructed current picture for use in subsequent motion-compensated prediction. In particular, references pictures in the RPS can be buffered in the DPB (470). The DPB (470) has limited memory space, however. If the reconstructed current picture is retained in the DPB (470) for use as a reference picture, another picture may be removed from the DPB (470) (and dropped from the RPS). The general encoding control (420) decides which pictures to retain in the RPS and buffer in the DPB (470). Using the block hash dictionary (451), the general encoding control (420) can make decisions about which reference pictures to retain in the RPS, as explained below.

The header formatter/entropy coder (490) formats and/or entropy codes the general control data (422), quantized transform coefficient data (432), intra prediction data (442), motion data (452) and filter control data (462). For the motion data (452), the header formatter/entropy coder (490) can select and entropy code merge mode index values, or a default MV predictor can be used. In some cases, the header formatter/entropy coder (490) also determines MV differentials for MV values (relative to MV predictors), then entropy codes the MV differentials, e.g., using context-adaptive binary arithmetic coding.

The header formatter/entropy coder (490) provides the encoded data in the coded video bitstream (495). The format of the coded video bitstream (495) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of an encoder (400) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (400). The relationships shown between modules within the encoder (400) indicate general flows of information in the encoder; other relationships are not shown for the sake of simplicity.

V. Types of Video

The approaches described herein for creating hash tables, selecting MV precision, and determining scene changes can be applied when encoding any type of video. In particular, however, these approaches can improve performance when encoding certain artificially-created video content such as screen capture content.

Figure 5:
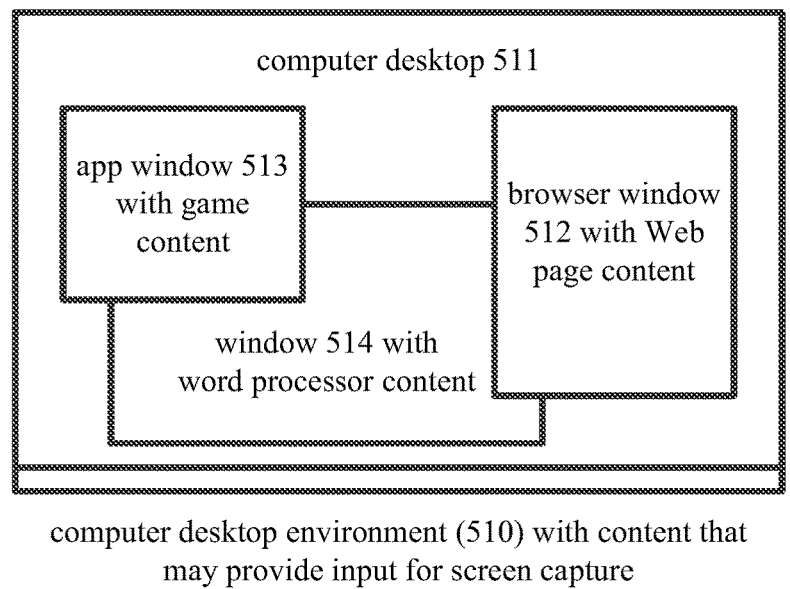
FIG. 5 is diagram illustrating a computer desktop environment with content that may provide input for screen capture.

In general, screen capture content represents the output of a computer screen or other display. FIG. 5 shows a computer desktop environment (510) with content that may provide input for screen capture. For example, video of screen capture content can represent a series of images of the entire computer desktop (511). Or, video of screen capture content can represent a series of images for one of the windows of the computer desktop environment, such as the app window (513) including game content, browser window (512) with Web page content or window (514) with word processor content.

As computer-generated, artificially-created video content, screen capture content tends to have relatively few discrete sample values, compared to natural video content that is captured using a video camera. For example, a region of screen capture content often includes a single uniform color, whereas a region in natural video content more likely includes colors that gradually vary. Also, screen capture content typically includes distinct structures (e.g., graphics, text characters) that are exactly repeated from frame-to-frame, even if the content may be spatially displaced (e.g., due to scrolling). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0, YUV 4:2:2).

Figure 6:
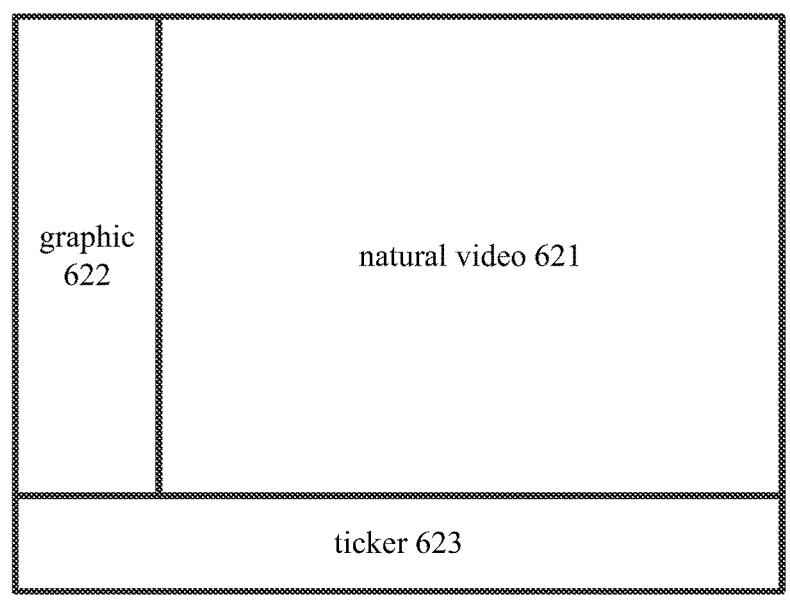
FIG. 6 is a diagram illustrating composite video with natural video content and artificially-created video content.

FIG. 6 shows composite video (620) that includes natural video content (621) and artificially-created video content. The artificially-created video content includes a graphic (622) beside the natural video content (621) and ticker (623) running below the natural video content (621). Like the screen capture content shown in FIG. 5, the artificially-created video content shown in FIG. 6 tends to have relatively few discrete sample values. It also tends to have distinct structures (e.g., graphics, text characters) that are exactly repeated from frame-to-frame or gradually offset from frame-to-frame (e.g., due to scrolling).

VI. Examples of Hash-Based Block Matching

In various innovations described herein, a video encoder uses the results of hash-based block matching when making decisions about parameters during encoding. This section describes examples of hash-based block matching.

A. Hash-Based Block Matching

When an encoder uses hash-based block matching, the encoder determines a hash value for each of multiple candidate blocks of one or more reference pictures. A hash table stores the hash values for the candidate blocks. The encoder also determines a hash value for a current block by the same hashing approach, and then searches the hash table for a matching hash value. If two blocks are identical, their hash values are the same. Using hash values, an encoder can quickly and efficiently identify candidate blocks that have the same hash value as the current block, and filter out candidate blocks that have different hash values. Depending on implementation and the goals of the hash-based block matching, the encoder may then further evaluate those candidate blocks having the same hash value as the current block. (Different blocks can have the same hash value. So, among the candidate blocks with the same hash value, the encoder can further identify a candidate block that matches the current block.)

In some example implementations, hash values for candidate blocks are determined from the input sample values for the pictures (reference pictures) that include the candidate blocks. During hash-based block matching, the encoder determines the hash value for a current block using input sample values. The encoder compares it (or otherwise uses the hash value) against the hash values determined from input sample values for candidate blocks. Even so, reconstructed sample values from the matching block are used to represent the current block. Thus, prediction operations still use reconstructed sample values.

Alternatively, the candidate blocks considered in hash-based block matching include reconstructed sample values. That is, the candidate blocks are part of previously encoded then reconstructed content in a picture. Hash values for the candidate blocks are determined from the reconstructed sample values. During hash-based block matching, the encoder determines the hash value for a current block using input sample values. The encoder compares it (or otherwise uses the hash value) against the hash values determined from reconstructed sample values for candidate blocks.

FIG. 7 illustrates hash values (700) for candidate blocks B(x, y) in hash-based block matching, where x and y indicate horizontal and vertical coordinates, respectively, for the top-left position of a given candidate block. The candidate blocks have hash values determined using a hash function h( ). For a candidate block B(x, y) in a reference picture, the encoder determines a hash value h(B) for the candidate block from input sample values for the reference picture. The encoder can determine hash values for all candidate blocks in the reference picture. Or, the encoder can screen out some candidate blocks.

In general, the hash function h( ) yields n possible hash values, designated $h_0$ to $h_{n-1}$. For a given hash value, the candidate blocks with that hash value are grouped. For example, in FIG. 7, the candidate blocks B(1266, 263), B(1357, 365), B(1429, 401), B(502, 464), . . . have the hash value $h_0$. Groups can include different numbers of candidate blocks. For example, in FIG. 7, the group for hash value $h_4$ includes a single candidate block, while the group for hash value $h_0$ includes more than four candidate blocks.

In this way, the possible candidate blocks are distributed into n categories. For example, if the hash function h( ) produces 12-bit hash values, the candidate blocks are split into $2^{12}$=4,096 categories. The number of candidate blocks per hash value can be further reduced by eliminating redundant, identical blocks with that hash value, or by screening out candidate blocks having certain patterns of sample values. Also, the encoder can iteratively winnow down the number of candidate blocks using different hash functions.

The hash function used for hash-based block matching depends on implementation. A hash function can produce hash values with 8 bits, 12 bits, 16 bits, 24 bits, 32 bits, or some other number of bits. If a hash value has fewer bits, the data structure includes fewer categories, but each category may include more candidate blocks. On the other hand, using hash values with more bits tends to increase the size of the data structure that organizes candidate blocks. If a hash value has more bits, the data structure includes more categories, but each category may include fewer candidate blocks. The hash function h( ) can be a cryptographic hash function, part of a cryptographic hash function, cyclic redundancy check ("CRC") function, part of a CRC, or another hash function (e.g., using averaging and XOR operations to determine the signature of a candidate block or current block). Some types of hash function (e.g., CRC function) map similar blocks to different hash values, which may be efficient when seeking a matching block that exactly corresponds with a current block. Other types of hash function (e.g., locality-sensitive hash function) map similar blocks to the same hash value.

During hash-based block matching, with the hash function h( ) the encoder determines the hash value for the current block $B_{current}$. In FIG. 7, the hash value $h(B_{current})$ is $h_3$. Using the hash value of the current block, the encoder can identify candidate blocks that have the same hash value (shown in outlined box in FIG. 7), and filter out the other candidate blocks. When a hash function maps similar blocks to different hash values, the identified candidate blocks (same hash value as the current block) include blocks that might be identical to the current block. When a hash function maps similar blocks to the same hash value, the identified candidate blocks (same hash value as the current block) include blocks that might be identical to the current block or might be close approximations of the current block. Either way, from these identified candidate blocks, the encoder can further identify a matching block for the current block (e.g., using sample-wise block matching operations, using a second hash function).

Overall, since hash value comparisons are much simpler than sample-wise block matching, hash-based block matching can make the process of evaluating the candidate blocks in reference picture(s) much more efficient. Also, hash values for candidate blocks can be reused in hash-based block matching for different blocks within a picture during encoding. In this case, the cost of computing the hash values for the candidate blocks can be amortized across hash-based block matching operations for the entire picture, for other pictures that use the same reference picture, and for other encoder-side decisions that use the hash values.

B. Data Structures for Hash-Based Block Matching

In some example implementations, the encoder uses a data structure that organizes candidate blocks according to their hash values. The data structure can help make hash-based block matching more computationally efficient. The data structure implements, for example, a block hash dictionary or hash table as described herein.

FIG. 8a illustrates an example data structure (800) that organizes candidate blocks for hash-based block matching. For the hash function h( ), the n possible hash values are $h_0$ to $h_{n-1}$. Candidate blocks with the same hash value are classified in the same candidate block list. A given candidate block list can include zero or more entries. For example, the candidate block list for the hash value $h_2$ has no entries, the list for the hash value $h_6$ has two entries, and the list for the hash value $h_1$ has more than four entries.

An entry($h_i$, k) includes information for the $k^{th}$ candidate block with the hash value $h_i$. As shown in FIG. 8b, an entry in a candidate block list can include the address of a block B(x, y) (e.g., horizontal and vertical coordinates for the top-left position of the block). Or, as shown in FIG. 8c, an entry in a candidate block list can include the address of a block B(x, y) and a hash value from a second hash function, which can be used for iterative hash-based block matching.

During hash-based block matching for a current block, the encoder determines the hash value of the current block $h(B_{current})$. The encoder retains the candidate block list with the same hash value and rules out the other n−1 lists. To select the matching block, the encoder can compare the current block with the candidate block(s), if any, in the retained candidate block list. Thus, by a simple lookup operation using the hash value $h(B_{current})$ the encoder can eliminate (n−1)/n of the candidate blocks (on average), and focus on the remaining 1/n candidate blocks (on average) in the retained list, significantly reducing the number of sample-wise block matching operations.

Different data structures can be used for different reference pictures. Alternatively, an entry for a candidate block in the data structure stores information indicating the reference picture that includes the candidate block, which can be used in hash-based block matching.

Also, different data structures can be used for different sizes of blocks. For example, one data structure includes hash values for 8×8 candidate blocks, a second data structure includes hash values for 16×16 candidate blocks, a third data structure includes hash values for 32×32 candidate blocks, and so on. The data structure used during hash-based block matching depends on the size of the current block. Alternatively, a single, unified data structure can be used for different sizes of blocks. A hash function can produce an n-bit hash value, where m bits of the n-bit hash value indicate a hash value among the possible blocks of a given block size according to an m-bit hash function, and the remaining n-m bits of the n-bit hash value indicate the given block size. For example, the first two bits of a 14-bit hash function can indicate a block size, while the remaining 12 bits indicate a hash value according to a 12-bit hash function. Or, a hash function can produce an m-bit hash value regardless of the size of the block, and an entry for a candidate block in the data structure stores information indicating the block size for the candidate block, which can be used in hash-based block matching.

For a high-resolution picture, the data structure can store information representing a very large number of candidate blocks. To reduce the amount of memory used for the data structure, the encoder can eliminate redundant values. For example, the encoder can skip adding identical blocks to the data structure. In general, reducing the size of the data structure by eliminating identical blocks can hurt coding efficiency. Thus, by deciding whether to eliminate identical blocks, the encoder can trade off memory size for the data structure and coding efficiency. The encoder can also screen out candidate blocks, depending on the content of the blocks.

C. Iterative Hash-Based Block Matching

When the encoder uses a single hash function with n possible hash values, the encoder can rule out n−1 lists of candidate blocks based on the hash value of a current block, but the encoder may still need to perform sample-wise block matching operations for the remaining candidate block(s), if any, for the list with the matching hash value. Also, when updating a data structure that organizes candidate blocks, the encoder may need to perform sample-wise block matching operations to identify identical blocks. Collectively, these sample-wise block matching operations can be computationally intensive.

Therefore, in some example implementations, the encoder uses iterative hash-based block matching. Iterative hash-based block matching can speed up the block matching process and also speed up the process of updating a data structure that organizes candidate blocks.

Iterative hash-based block matching uses multiple hash values determined with different hash functions. For a block B (current block or candidate block), in addition to the hash value h(B), the encoder determines another hash value h'(B) using a different hash function h'( ) With the first hash value h($B_{current}$) for a current block, the encoder identifies candidate blocks that have the same hash value for the first hash function h( ) To further rule out some of these identified candidate blocks, the encoder uses a second hash value h'($B_{current}$) for the current block, which is determined using a different hash function. The encoder compares the second hash value h'($B_{current}$) with the second hash values for the previously identified candidate blocks (which have same first hash value), in order to filter out more of the candidate blocks. A hash table tracks hash values for the candidate blocks according to the different hash functions.

In the example of FIG. 8a, if h($B_{current}$)=$h_3$, the encoder selects the candidate blocks with entry(3, 0), entry (3, 1), entry(3, 2), entry(3, 3), . . . for further refinement. As shown in FIG. 8c, for a candidate block B, an entry includes a block address and a second hash value h'(B) from the hash function h'( ). The encoder compares the second hash value h'($B_{current}$) for the current block with the second hash values h'(B) for the respective candidate blocks with entry(3, 0), entry (3, 1), entry(3, 2), entry(3, 3), . . . . Based on results of the second hash value comparisons, the encoder can rule out more of the candidate blocks, leaving candidate blocks, if any, that have first and second hash values matching h($B_{current}$) and h'($B_{current}$), respectively. The encoder can perform sample-wise block matching on any remaining candidate blocks to select a matching block.

FIGS. 9a-9c show another example of iterative hash-based block matching that uses a different data structure. The data structure (900) in FIG. 9a organizes candidate blocks by first hash value from a first hash function h( ), which has n1 possible hash values. The data structure (900) includes lists for hash values from $h_0$ . . . $h_{n1-1}$. In the example, the encoder determines a first hash value h($B_{current}$)=$h_2$ for the current block, and selects the list for $h_2$ from the structure (900).

As shown in FIG. 9b, the list (910) for $h_2$ includes multiple lists that further organize the remaining candidate blocks by second hash value from a second hash function h'( ) which has n2 possible hash values. The list (910) includes lists for hash values from $h'_0$ . . . $h'_{n2-1}$, each including entries with block addresses (e.g., horizontal and vertical coordinates for top-left positions of respective candidate blocks), as shown for the entry (920) in FIG. 9c. In the example, the encoder determines a second hash value h'($B_{current}$)=$h'_0$ for the current block, and selects the list for $h'_0$ from the list (910). For the candidate blocks in the list for $h'_0$, the encoder can perform sample-wise block matching to select a matching block. In this example, the lists for the second hash values are specific to a given list for the first hash value. Alternatively, there is one set of lists for the second hash values, and the encoder identifies any candidate blocks that are (1) in the matching list for the first hash values and also (2) in the matching list for the second hash values.

Aside from hash-based block matching, the second hash function h'( ) can be used to simplify the process of updating a data structure that organizes candidate blocks. For example, when the encoder checks whether a new candidate block is identical to a candidate block already represented in the data structure, the encoder can use multiple hash values with different hash functions to filter out non-identical blocks. For remaining candidate blocks, the encoder can perform sample-wise block matching to identify any identical block.

In the preceding examples, the iterative hash-based block matching and updating use two different hash functions. Alternatively, the encoder uses three, four or more hash functions to further speed up hash-based block matching or filter out non-identical blocks, and thereby reduce the number of sample-wise block matching operations. Also, for a low-complexity encoder or for faster decision-making processes, the encoder can skip sample-wise block matching operations when hash values match. For hash functions with a large number of possible hash values, there is a high probability that two blocks are identical if hash values for the two blocks match. In particular, in some example implementations of encoder-side decisions described below, the encoder considers, as the results of hash-based block matching, whether hash values match, but does not perform any sample-wise block matching operations.

VII. Managing Hash Table Size

This section presents various approaches to managing the size of hash tables used in hash-based block matching. In some solutions, the size of a hash table is reduced by screening out (omitting) candidate blocks having certain patterns of sample values (e.g., by screening out homogeneous blocks). In a particular implementation, for each of multiple candidate blocks (e.g., in a reference picture), the encoder evaluates whether the candidate block satisfies a complexity criterion. If so, the encoder determines a block hash value for the candidate block and adds the block hash value to a hash table. The block hash value can be computed using original sample values or reconstructed sample values. If the candidate block does not satisfy the complexity criterion, the encoder does not determine a block hash value for the candidate block. For example, the complexity criterion can be satisfied for a given candidate block if (a) at least one row of the given candidate block has non-uniform sample values, and/or (b) at least one column of the given candidate block has non-uniform sample values. With this criterion, the encoder can screen out uniform blocks (homogeneous blocks), blocks with rows of uniform sample values (horizontally homogeneous blocks) and blocks with columns of uniform sample values (vertically homogeneous blocks). More generally, when evaluating whether a given candidate block satisfies the complexity criterion, the encoder can compute a complexity metric for the candidate block and compare the complexity metric to a threshold.

Figure 10A:
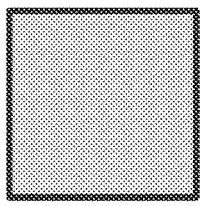
FIGS. 10a-10c are diagrams illustrating patterns of candidate blocks.
Figure 10B:
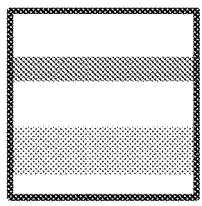
Figure 10C:
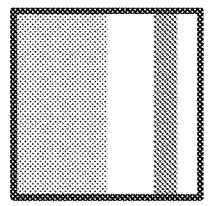

FIGS. 10a-10c show patterns of candidate blocks that an encoder can screen out during hash table construction before a block hash value for a candidate block is added to a hash table. FIG. 10a shows a block (1000) with uniform sample values. FIG. 10b shows a block (1010) whose rows each have uniform sample values (a horizontally homogeneous block), although the values can be different from row to row. FIG. 10c shows a block (1020) whose columns each have uniform sample values (a vertically homogeneous block), although the values can be different from column to column. For example, to identify these patterns of candidate blocks, an encoder can check if each row or each column of a candidate block has uniform sample values.

However, excluding homogeneous blocks (e.g., all homogeneous blocks) as candidates in the hash table can negatively impact the benefits of hash-based matching in certain situations. For example, some encoding algorithms operate more efficiently when an exact match is found (e.g., by terminating the matching process once a hash match is found). In addition, excluding homogeneous blocks as candidates can reduce the likelihood of an exact match. Therefore, improvements in encoding efficiency can be realized by retaining at least some homogeneous blocks in the hash table.

In the approaches presented in this section, hash table size is managed such that some homogeneous blocks are included in the hash table (e.g., which can improve the chances of finding a hash match and/or an exact match, and improve encoding efficiency as a result) while other homogeneous blocks are still excluded. For example, including only some homogeneous blocks (e.g., only a relatively small proportion of homogeneous blocks in a given picture) can still provide the benefits of improved encoding efficiency while also retaining the benefits of a smaller hash table.

In some implementations, only homogeneous blocks that satisfy a homogeneous selection criterion are included in the hash table. The homogeneous selection criterion can include checking whether the coordinates of a given homogeneous block are aligned with particular divisions of a picture. For example, a reference picture can be divided into a grid with particular horizontal and vertical spacing (e.g., a 16 by 16 pixel grid, a 16 by 8 pixel grid, etc.). If a homogeneous block is aligned with the grid (e.g., if a starting pixel coordinate of the block is horizontally and/or vertically aligned) then it can be selected as matching the criteria. Stated another way, consider a block with dimensions of width by height (W×H) that starts from coordinates (x, y). The homogeneous selection criterion can be defined as:

$$x \% M == 0 \;\&\&\; y \% N == 0$$

where M and N are pre-defined numbers (e.g., the same number or different numbers). Another way of stating the selection criterion is:

$$x \;\&\; (M-1) == 0 \;\&\&\; Y \;\&\; (N-1) == 0$$

where M and N are both powers of 2. In some implementations, M and N are both 16. For example, if a homogeneous block is at coordinates 32, 32, then it would be selected when using the M=16 and N=16 values (as would blocks at 0,0 and 32,0 and 64,0 and 0,32 and 0,64 and so on), while a homogeneous block at coordinates 35, 32 would not be selected. In some implementations, M is set to the width (W) of the blocks and N is set to the height (H) of the blocks.

Figure 11:
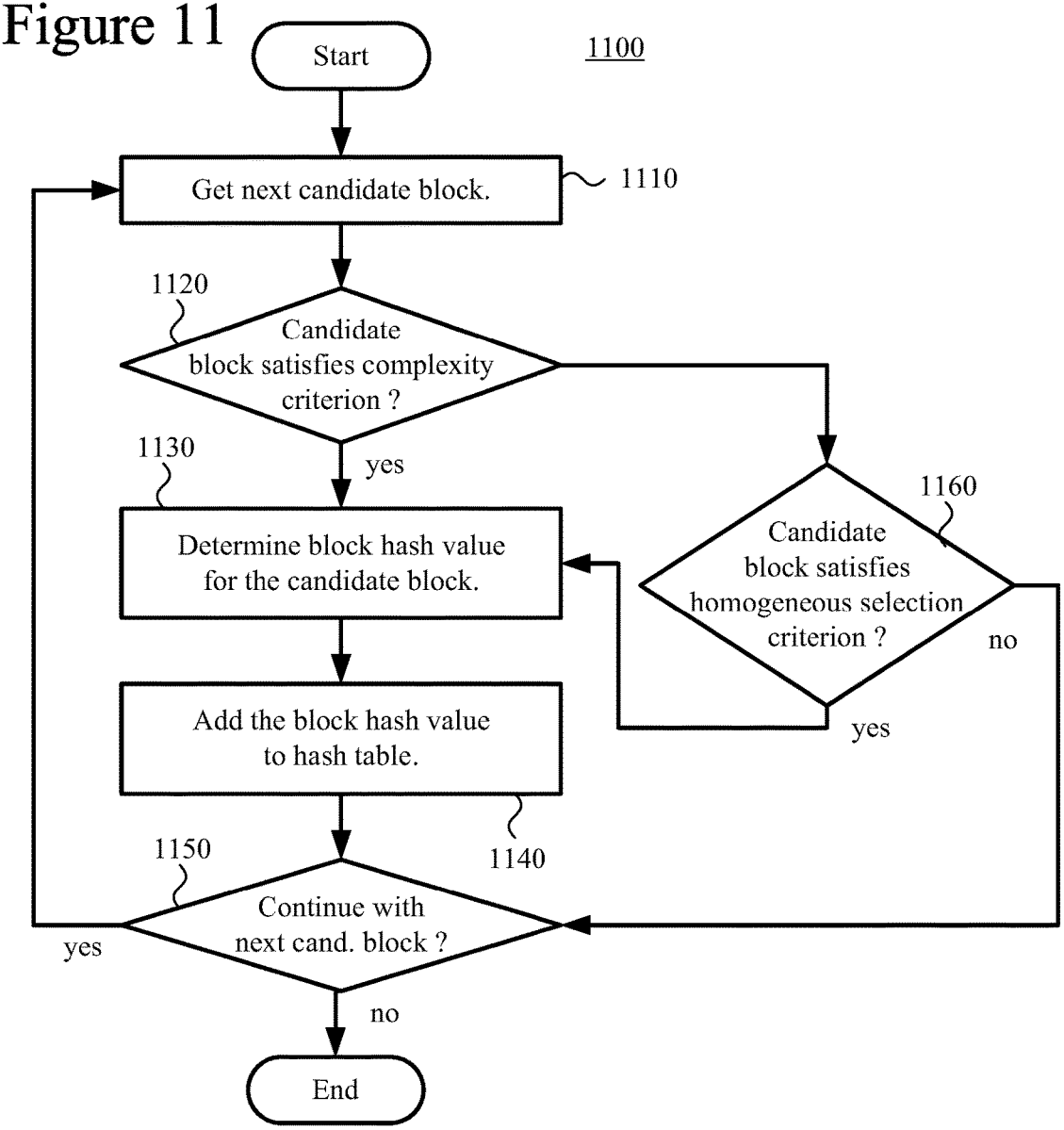
FIG. 11 is a flowchart illustrating a technique for selecting homogeneous blocks using a homogeneous selection criterion during hash table construction.

FIG. 11 a technique (1100) for selecting particular homogeneous blocks during hash table construction. An image encoder or video encoder such as one described with reference to FIG. 3 or FIGS. 4a-4b can perform the technique (1100).

The encoder gets (1110) the next candidate block and evaluates (1120) whether the candidate block satisfies a complexity criterion. For example, in some example implementations, the complexity criterion is satisfied if (a) at least one row of the given candidate block has non-uniform sample values and/or (b) at least one column of the given candidate block has non-uniform sample values, and the complexity criterion is not satisfied if (a) the block has rows of uniform sample values (a horizontally homogeneous block) and/or (b) the block has columns of uniform sample values (a vertically homogeneous block). Or, more generally, the encoder can compute a complexity metric for the candidate block, then compare the complexity metric to a threshold. For example, the complexity metric is a count of non-zero AC coefficients at a non-zero horizontal position and/or a non-zero vertical position for the candidate block after a frequency transform (e.g., DCT), and the threshold is zero. The complexity criterion is satisfied if there are any non-zero AC coefficients outside the top row of AC coefficients and left column of AC coefficients for the candidate block. Alternatively, the encoder considers another complexity metric. The complexity criterion can be evaluated, at least in part, by comparing hash values of sections (e.g., rows, columns, sub-blocks) of the candidate block.

If the candidate block satisfies the complexity criterion, the encoder determines (1130) a block hash value for the candidate block and adds (1140) the block hash value to a hash table. The block hash value can be determined using any hashing approach.

If the candidate block does not satisfy the complexity criterion (e.g., of the candidate block is horizontally homogeneous and/or vertically homogeneous), the candidate block is checked to determine (1160) if it satisfies a homogeneous selection criterion. If the candidate block satisfies the homogeneous selection criterion the encoder determines (1130) a block hash value for the candidate block and adds (1140) the block hash value to a hash table. The block hash value can be determined using any hashing approach. Otherwise (if the candidate block does not satisfy the homogeneous selection criterion), no block hash value for the candidate block is added to the hash table.

In some implementations, the candidate block satisfies the homogeneous selection criterion when at least one of an x and a y start coordinate (e.g., the upper-left pixel coordinate) of the candidate block is evenly divisible by a pre-determined value. For example, if the pre-determined value is 16, then an x coordinate value that is 0, 16, 32, 48, etc. would satisfy the condition. The pre-determined value can be different for the x and y coordinates. In some implementations, a pre-determined value for the x coordinate is set to the width of the candidate block and a pre-determined value for the y coordinate is set to the height of the candidate block.

The encoder determines (1150) whether to continue with the next candidate block. If so, the encoder continues by getting (1110) the next candidate block and evaluating (1120) whether the next candidate block satisfies the complexity criterion. In this way, the encoder can selectively determine block hash values for multiple candidate blocks (e.g., for the candidate blocks of a picture, such as a reference picture), depending on whether the respective candidate blocks satisfy the complexity criterion and the homogeneous selection criterion.

VIII. Determination of MV Resolution

This section presents various approaches for adaptive determination of motion vector ("MV") resolution during encoding, depending on the results of hash-based block matching (e.g., matching hash values). By selecting appropriate MV precision values for the MV resolution during encoding, these approaches can facilitate compression that is effective in terms of rate-distortion performance and/or computational efficiency of encoding and decoding. MV precision can be determined for a picture, a block, a slice, etc.

A. Different MV Precisions

When encoding artificially-created video content, MV values usually represent integer-sample spatial displacements (integer MV precision), and very few MV values represent fractional-sample spatial displacements (fractional MV precision). This provides opportunities for efficiently determining MV precision (e.g., for an entire picture at a time, or for a portion of a picture) to improve overall performance.

Figure 12A:
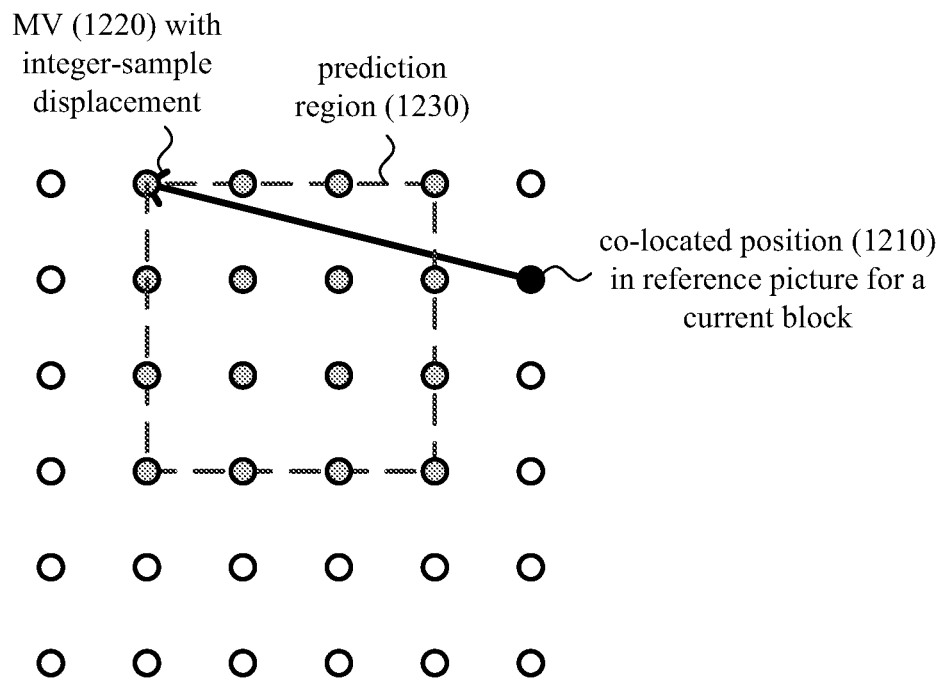
FIGS. 12a and 12b are diagrams illustrating motion compensation with MV values having an integer-sample spatial displacement and fractional-sample spatial displacement, respectively.

FIG. 12a shows motion compensation with an MV (1220) having an integer-sample spatial displacement. The MV (1220) indicates a spatial displacement of four samples to the left, and one sample up, relative to the co-located position (1210) in a reference picture for a current block. For example, for a 4×4 current block at position (64, 96) in a current picture, the MV (1220) indicates a 4×4 prediction region (1230) whose position is (60, 95) in the reference picture. The prediction region (1230) includes reconstructed sample values at integer-sample positions in the reference picture. An encoder or decoder need not perform interpolation to determine the values of the prediction region (1230).

Figure 12B:
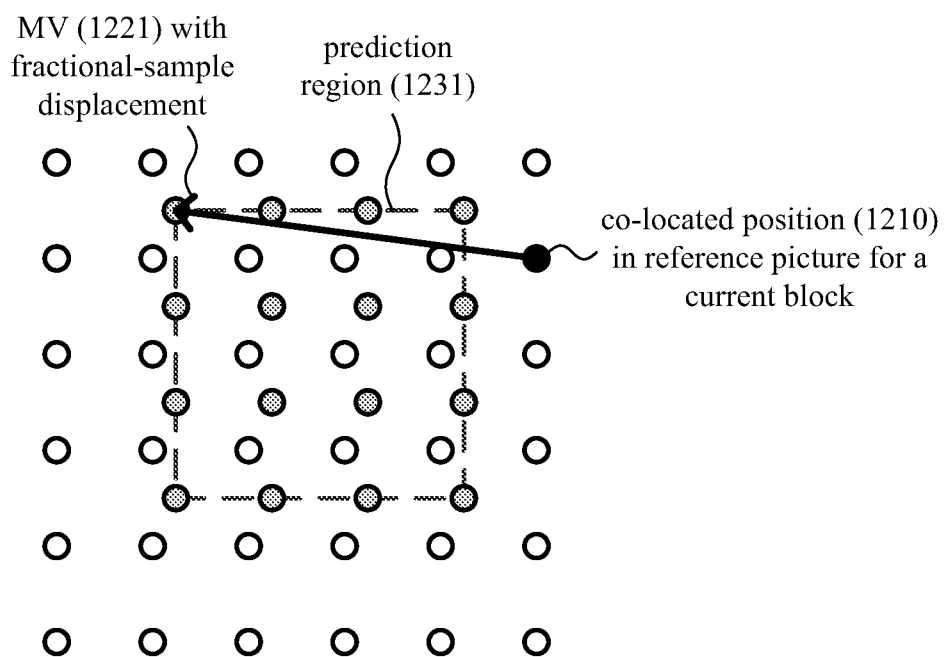

FIG. 12b shows motion compensation with an MV (1221) having a fractional-sample spatial displacement. The MV (1221) indicates a spatial displacement of 3.75 samples to the left, and 0.5 samples up, relative to the co-located position (1210) in a reference picture for a current block. For example, for a 4×4 current block at position (64, 96) in a current picture, the MV (1221) indicates a 4×4 prediction region (1231) whose position is (60.25, 95.5) in the reference picture. The prediction region (1231) includes interpolated sample values at fractional-sample positions in the reference picture. An encoder or decoder performs interpolation to determine the sample values of the prediction region (1231). When fractional-sample spatial displacements are allowed, there are more candidate prediction regions that may match a current block, and thus the quality of motion-compensated prediction usually improves, at least for some types of video content (e.g., natural video content).

B. Representation of MV Values

MV values are typically represented using integer values whose meaning depends on MV precision. For integer-sample MV precision, for example, an integer value of 1 indicates a spatial displacement of 1 sample, an integer value of 2 indicates a spatial displacement of 2 samples, and so on. For ¼-sample MV precision, for example, an integer value of 1 indicates a spatial displacement of 0.25 samples. Integer values of 2, 3, 4 and 5 indicate spatial displacements of 0.5, 0.75, 1.0 and 1.25 samples, respectively. Regardless of MV precision, the integer value can indicate a magnitude of the spatial displacement, and separate flag value can indicate whether displacement is negative or positive. The horizontal MV component and vertical MV component of a given MV value can be represented using two integer values. Thus, the meaning of two integer values representing an MV value depends on MV precision. For example, for an MV value having a 2-sample horizontal displacement and no vertical displacement, if MV precision is ¼-sample MV precision, the MV value is represented as (8, 0). If MV precision is integer-sample MV precision, however, the MV value is represented as (2, 0).

MV values in a bitstream of encoded video data are typically entropy coded (e.g., on an MV-component-wise basis). An MV value may also be differentially encoded relative to a predicted MV value (e.g., on an MV-component-wise basis). In many cases, the MV value equals the predicted MV value, so the differential MV value is zero, which can be encoded very efficiently. A differential MV value (or MV value, if MV prediction is not used) can be entropy encoded using Exponential-Golomb coding, context-adaptive binary arithmetic coding or another form of entropy coding. Although the exact relationship between MV value (or differential MV value) and encoded bits depends on the form of entropy coding used, in general, smaller values are encoded more efficiently (that is, using fewer bits) because they are more common, and larger values are encoded less efficiently (that is, using more bits) because they are less common.

C. Adaptive MV Precision—Introduction

To summarize the preceding two sections, using MV values with integer-sample MV precision tends to reduce bit rate associated with signaling MV values and reduce computational complexity of encoding and decoding (by avoiding interpolation of sample values at fractional-sample positions in reference pictures), but may reduce the quality of motion-compensated prediction, at least for some types of video content. On the other hand, using MV values with fractional-sample MV precision tends to increase bit rate associated with signaling MV values and increase computational complexity of encoding and decoding (by including interpolation of sample values at fractional-sample positions in reference pictures), but may improve the quality of motion-compensated prediction, at least for some types of video content. In general, computational complexity, bit rate for signaling MV values, and quality of motion-compensated prediction increase as MV precision increases (e.g., from integer-sample to ½-sample, or from ½-sample to ¼-sample), up to a point of diminishing returns.

When encoding artificially-created video content, the added costs of fractional-sample MV precision (in terms of bit rate and computational complexity) may be unjustified. For example, if most MV values represent integer-sample spatial displacements, and very few MV values represent fractional-sample spatial displacements, the added costs of fractional-sample MV precision are not warranted. The encoder can skip searching at fractional-sample positions (and interpolation operations to determine sample values at those positions) during motion estimation. For such content, bit rate and computational complexity can be reduced, without a significant penalty to the quality of motion-compensated prediction, by using MV values with integer-sample MV precision.

Since fractional-sample MV precision may still be useful for other types of video content (e.g., natural video captured by camera), an encoder and decoder can be adapted to switch between MV precisions. For example, an encoder and decoder can use integer-sample MV precision for artificially-created video content, but use a fractional-sample MV precision (such as ¼-sample MV precision) for natural video content. Approaches that an encoder may follow when selecting MV precision are described in the next section. The encoder can signal the selected MV precision to the decoder using one or more syntax elements in the bitstream.

In one approach to signaling MV precision, when adaptive selection of MV precision is enabled, the encoder selects an MV precision on a slice-by-slice basis. A flag value in a sequence parameter set ("SPS"), picture parameter set ("PPS") or other syntax structure indicates whether adaptive selection of MV precision is enabled. If so, one or more syntax elements in a slice header for a given slice indicate the selected MV precision for blocks of that slice. For example, a flag value of 0 indicates ¼-sample MV precision, and a flag value of 1 indicates integer-sample MV precision.

In another approach to signaling MV precision, the encoder selects an MV precision on a picture-by-picture basis or slice-by-slice basis. A syntax element in a PPS indicates one of three MV precision modes: (0) ¼-sample MV precision for MV values of slice(s) of a picture associated with the PPS, (1) integer-sample MV precision for MV values of slice(s) of a picture associated with the PPS, or (2) slice-adaptive MV precision depending on a flag value signaled per slice header, where the flag value in the slice header can indicate ¼-sample MV precision or integer-sample MV precision for MV values of the slice.

In still another approach to signaling MV precision, when adaptive selection of MV precision is enabled, the encoder selects an MV precision on a CU-by-CU basis. One or more syntax elements in a structure for a given CU indicate the selected MV precision for blocks of that CU. For example, a flag value in a CU syntax structure for a CU indicates whether MV values for all PUs associated with the CU have integer-sample MV precision or ¼-sample MV precision.

In any of these approaches, the encoder and decoder can use different MV precisions for horizontal and vertical MV components. This can be useful when encoding artificially-created video content that has been scaled horizontally or vertically (e.g., using integer-sample MV precision in an unscaled dimension, and using a fractional-sample MV precision in a scaled dimension). In some example implementations, if rate control cannot be achieved solely through adjustment of QP values, an encoder may resize video horizontally or vertically to reduce bit rate, then encode the resized video. At the decoder side, the video is scaled back to its original dimensions after decoding. The encoder can signal the MV precision for horizontal MV components and also signal the MV precision for vertical MV components to the decoder.

More generally, when adaptive selection of MV precision is enabled, the encoder selects an MV precision and signals the selected MV precision in some way. For example, a flag value in a SPS, PPS or other syntax structure can indicate whether adaptive selection of MV precision is enabled. When adaptive MV precision is enabled, one or more syntax elements in sequence-layer syntax, GOP-layer syntax, picture-layer syntax, slice-layer syntax, tile-layer syntax, block-layer syntax or another syntax structure can indicate the selected MV precision for horizontal and vertical components of MV values. Or, one or more syntax elements in sequence-layer syntax, GOP-layer syntax, picture-layer syntax, slice-header-layer syntax, slice-data-layer syntax, tile-layer syntax, block-layer syntax or another syntax structure can indicate MV precisions for different MV components. When there are two available MV precisions, a flag value can indicate a selection between the two MV precisions. Where there are more available MV precisions, an integer value can a selection between those MV precisions.

Aside from modifications to signal/parse the syntax elements that indicate selected MV precision(s), decoding can be modified to change how signaled MV values are interpreted depending on the selected MV precision. The details of how MV values are encoded and reconstructed can vary depending on MV precision. For example, when the MV precision is integer-sample precision, predicted MV values can be rounded to the nearest integer, and differential MV values can indicate integer-sample offsets. Or, when the MV precision is ¼-sample precision, predicted MV values can be rounded to the nearest ¼-sample offset, and differential MV values can indicate ¼-sample offsets. Or, MV values can be signaled in some other way. When MV values have integer-sample MV precision and the video uses 4:2:2 or 4:2:0 chroma sampling, chroma MV values can be derived by scaling, etc., which may result in ½-sample displacements for chroma. Or, chroma MV values can be rounded to integer values.

Alternatively, the encoder does not change how MV values are predicted or how MV differences are signaled in the bitstream, nor does the decoder change how MV values are predicted or how MV differences are reconstructed, but the interpretation of reconstructed MV values changes depending on the selected MV precision. If the selected MV precision is integer-sample precision, a reconstructed MV value is scaled by a factor of 4 before being used in a motion compensation process (which operates at quarter-sample precision). If the selected MV precision is quarter-sample precision, the reconstructed MV value is not scaled before being used in the motion compensation process.

D. Determining MV Resolution Using Categories

When MV resolution can be adapted during video encoding, an encoder selects an MV precision for a unit of video (e.g., the MV precision for one or both components of MV values for the unit). The encoder can select the MV precision to use depending on the results of classifying blocks into a plurality of categories, which can include hash-based block matching (e.g., matching hash values) in one or more of the classification operations. The selection of the MV precision can also depend on other factors, such as classification of blocks as uniform blocks (e.g., horizontally and/or vertically homogeneous blocks). These approaches can provide a computationally-efficient way to select appropriate MV precisions.

1. Example Techniques for Selecting MV Precision

Figure 13:
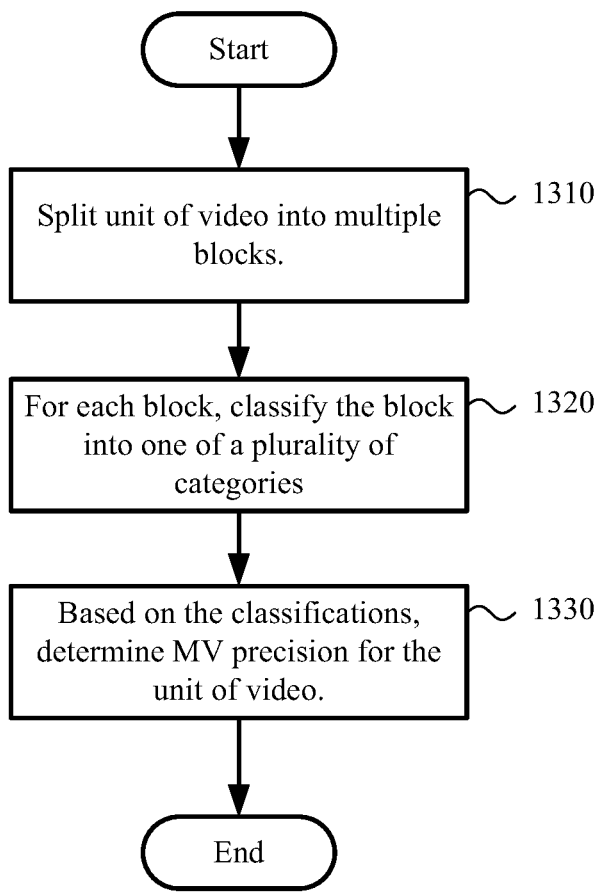
FIG. 13 is a flowchart illustrating a technique for selecting MV precision depending on the results block classification.

FIG. 13 shows a generalized technique (1300) for selecting MV precision depending on the results block classification. The technique (1300) can be performed by an encoder such as one described with reference to FIG. 3 or FIGS. 4a and 4b, or by another encoder.

The encoder encodes video to produce encoded data, and then outputs the encoded data in a bitstream. As part of the encoding, the encoder splits (1310) a unit of the video into multiple blocks (e.g., splits a picture, slice, or another unit of the video). Then, for each of the blocks, the encoder classifies (1320) the block into one of a plurality of categories. The categories can comprise a homogeneous category that uses a homogeneous classification criteria and/or a hash-match category that uses a hash-based matching classification criteria. Based on the classifications (e.g., counts of blocks in one or more of the plurality of categories), the encoder determines (1330) the MV precision for the unit of the video. For example, the encoder can determine whether to use integer MV precision or fractional MV precision (e.g., ¼-sample MV precision).

Figure 14:
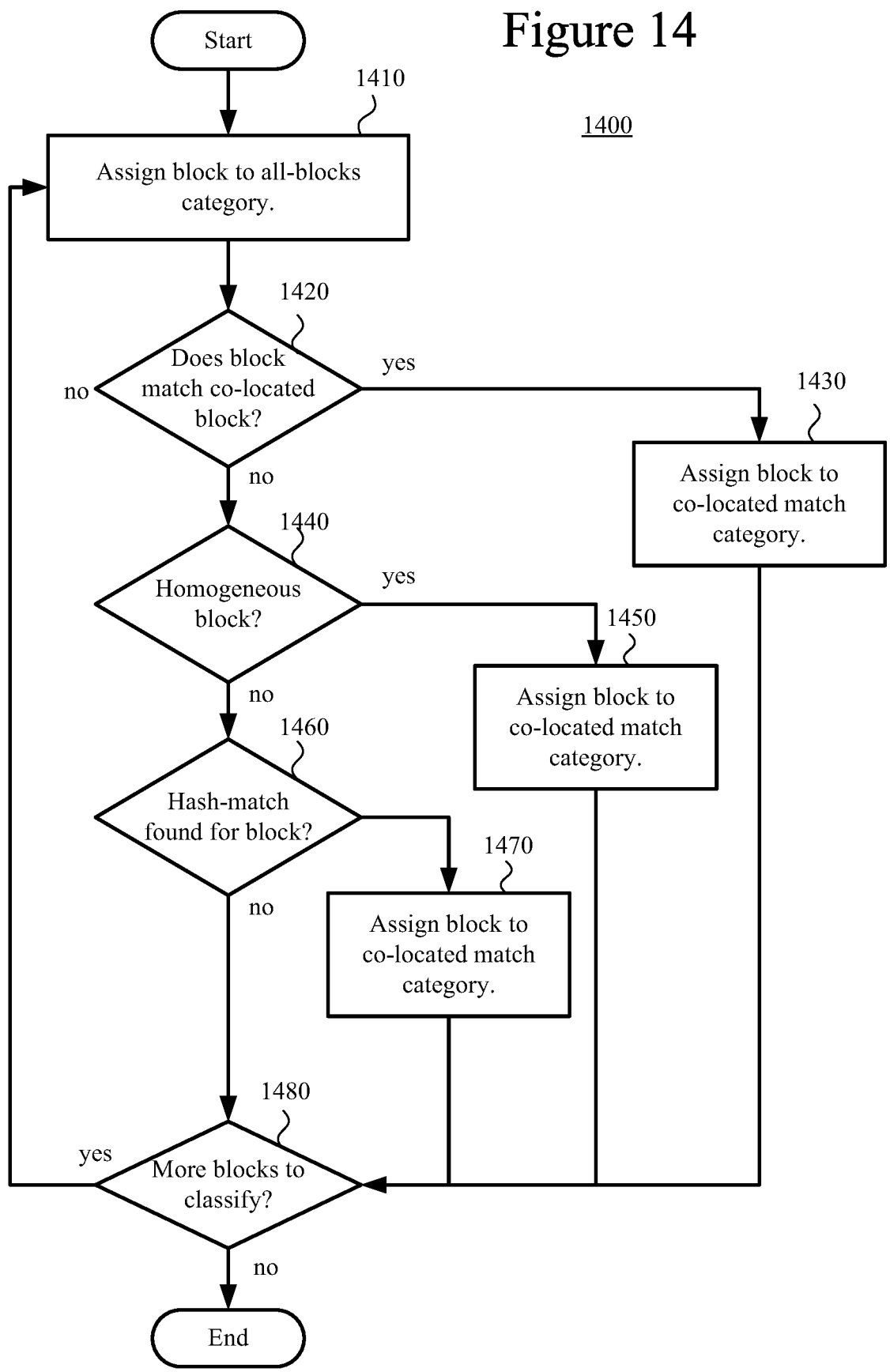
FIG. 14 is a flowchart illustrating a technique for performing block classification used when selecting MV precision.

FIG. 14 shows a technique (1400) for performing block classification used when selecting MV precision. The technique (1400) can be performed by an encoder such as one described with reference to FIG. 3 or FIGS. 4a and 4b, or by another encoder. The technique (1400) can be used to implement the block classification (1320) discussed above with regard to FIG. 13.

In order to classify a block, the technique (1400) first assigns the block to an all-blocks category (1410). Assigning the block to the all-blocks category can be performed by incrementing a block count associated with the all-blocks category by one.

The technique (1400) next determines if the block matches (1420) a co-located block in a reference picture (e.g., matches a block in at least one of one or more reference pictures used by the block), and if so assigns the block to a co-located match category (1430). Assigning the block to the co-located match category can be performed by incrementing a block count associated with the co-located match category by one.

If the block does not match a co-located block in a reference picture, the technique (1400) proceeds to check (1440) if the block is a homogeneous block (e.g., if the block satisfies a homogeneous classification criteria, which can be satisfied if the block is horizontally homogeneous and/or vertically homogeneous), and if so assigns the block to a homogeneous category (1450). Assigning the block to the homogeneous category can be performed by incrementing a block count associated with the homogeneous category by one.

If the block is not a homogeneous block, the technique (1400) proceeds to check (1460) if the block satisfies a hash-based matching classification criteria (e.g., if a hash value for the block is found in a hash table generated from candidate blocks of one or more reference pictures), and if so assigns the block to a hash-match category (1470). Assigning the block to the hash-match category can be performed by incrementing a block count associated with the hash-match category by one.

Once the block has been classified, the technique (1400) continues to classify the next block (1480) if any remain (e.g., in order to classify all blocks of the unit of the video).

The technique (1400) can be performed to classify multiple blocks of a video unit into a plurality of categories by incrementing a counter associated with each category when a block is assigned to the category.

In some implementations, blocks of a current picture are classified. The current picture can be split into non-overlapped width (W) by height (H) blocks. In one implementation, W=H=8. The encoder can perform hash-based block matching for all the blocks in the current picture. The search range could be one (or more) reference pictures for the current picture. In one implementation, the first reference picture in reference picture list 0 is used to perform the hash match.

In some implementations, the blocks are classified using the following four categories. The first category is called "T" (e.g., an all-blocks category). All blocks are assigned to the "T" category.

The second category is called "C" (e.g., a co-located match category). A block that matches a co-located block in a reference picture is assigned to the "C" category. If more than one reference picture is used, the block is assigned if it matches a co-located block in at least one of the reference pictures.

The third category is called "S" (e.g., a homogeneous or "smooth" category). A block that has not been assigned to the "C" category and that is homogeneous (e.g., horizontally and/or vertically homogeneous) is assigned to the "S" category.

The fourth category is called "M" (e.g., hash-match category). A block that has not been assigned to either the "C" category or the "S" category but that has a hash value found in a hash table generated from candidate blocks of one or more reference pictures is assigned to the "M" category.

In implementations that use the "T," "C," "S," and "M" categories, a CSMRate (e.g., a rate value) can be calculated which is:

$$CSMRate=(C+S+M)/T$$

The CSMRate indicates the percentage of "C," "S," and "M" blocks in the picture (or other unit of video). An AverageCSMRate can also be calculated which is the average value of CSMRate for the current picture and CSMRate of a number "Ncsm" previous coded pictures. An MRate can also be calculated which is MRate=M/T (the percentage of "M" blocks). AverageMRate is the average value of the MRate for the current picture and MRate of a number "Nm" previous coded pictures.

Using the categories described above and the values calculated from the "T," "C," "S," and "M" categories, one or more of the following rules can be applied (individually or in combination) to determine the MV precision (e.g., to decide whether to use integer MV precision or fractional MV precision, such as ¼-pel precision).

Rule 1: If CSMRate is greater than a threshold, use integer MV precision. Otherwise, use ¼-pel precision. (If the matching rate of the current picture is too slow, use fractional precision MV.)

Rule 2: If AverageCSMRate is greater than a threshold, use integer MV precision. Otherwise, use ¼-pel precision. (If the matching rate of the pictures in a sliding window is too slow, use fractional precision MV.)

Rule 3: If MRate is greater than a threshold, use integer MV precision. Otherwise, use ¼-pel precision. (If the matching rate of non-collocated non-smooth blocks is higher than a threshold, use integer precision MV.)

Rule 4: If AverageMRate is greater than a threshold, use integer MV precision. Otherwise, use ¼-pel precision. (If the average matching rate of non-collocated non-smooth blocks of the pictures in a sliding window is higher than a threshold, use integer precision MV.)

Rule 5: If C==T, use integer MV precision. Otherwise, use ¼-pel precision. (If all the blocks in the current picture match with collocated blocks in reference picture (two pictures are identical), use integer precision MV. In some implementations, this may not have significant impact on coding efficiency, but may help to save encoding time as using integer precision MV in the encoding process may skip some operations on fractional pixels, such as motion estimation on fractional pixels.)

Rule 6: If M>(T-C-S)/ratio1, use integer MV precision. Otherwise, use ¼-pel precision. (If the percentage of matched blocks in all the non-collocated non-smooth blocks is higher than a threshold, use integer precision MV.)

Rule 7: If CSMRate>threshold1 and MRate>threshold2, use integer MV precision. Otherwise, use ¼-pel precision. (If the percentage of CSM blocks is larger than a threshold (in some implementations, this threshold is near 1 to guarantee that most blocks are suitable to use integer precision MV) and the percentage of M blocks is larger than a threshold (e.g., to guarantee that we also can find some match for non-collocated non-smooth blocks), use integer precision MV.)

Rule 8: If AverageCSMRate+AverageMRate>threshold3 use integer MV precision. Otherwise, use ¼-pel precision. (Similar condition to the above one, but taking pictures in a sliding window into consideration.)

In an example implementation, the following settings are applied. The block size is 8×8. Hash matching is performed only for the first reference picture in reference picture list 0. Ncsm and Nm are both set to 31 (including current picture, a total of 32 pictures). In the example implementation, the motion vector precision is decided in the following order (the first "if" condition that is satisfied sets the MV precision, and if none of the "if" conditions are satisfied the "otherwise" condition will set ¼-pel precision):

If *CSM*Rate<0.8, use ¼-pel precision.

If *T*==*C*, use integer precision.

If Average*CSM*Rate<0.95, use ¼-pel precision.

If *M*>(*T-C-S*)/3, use integer precision.

If *CSM*Rate>0.99 && *M*Rate>0.01, use integer precision.

If Average*CSM*Rate+AverageMRate>1.01, use integer precision.

Otherwise, use ¼-pel precision.

In the techniques described in this section, the encoder can select between using ¼-sample MV precision and integer-sample MV precision. More generally, the encoder selects between multiple available MV precisions, which can include integer-sample MV precision, ½-sample MV precision, ¼-sample MV precision and/or another MV precision. The selected MV precision can apply for horizontal components and/or vertical components of MV values for the unit of video.

In the techniques described in this section, the hash-based block matching uses hash values determined from input sample values of the unit and (for candidate blocks) input sample values for one or more reference pictures. Alternatively, for candidate blocks represented in a hash table, the hash-based block matching can use hash values determined from reconstructed sample values.

In the techniques described in this section, when determining the MV precision for a unit of video, the encoder can also consider other factors, such as whether non-matched blocks contain a significant amount of natural video content (camera-captured video), as described in the next sections.

2. Alternatives and Variations

When the encoder uses the same pattern of tiles from picture-to-picture, the encoder can repeat per-tile MV precisions from picture-to-picture. Co-located tiles from picture-to-picture can use the same MV precision. Similarly, co-located slices from picture-to-picture can use the same MV precision. For example, suppose video depicts a computer desktop, and part of the desktop has a window displaying natural video content. A fractional-sample MV precision may be used within that region of the desktop from picture-to-picture, whether other areas that show text or other rendered content are encoded using integer-sample MV precision.

The encoder can adjust an amount of bias towards or against integer-sample MV precision based at least in part on a degree of confidence that integer-sample MV precision is appropriate. The encoder can also adjust an amount of bias towards or against integer-sample MV precision based at least in part on target computational complexity of encoding and/or decoding (favoring integer-sample MV precision to reduce computational complexity). For example, the encoder can adjust thresholds used in comparison operations to make it more likely or less likely that integer-sample MV precision is selected.

The selected MV precision can be for horizontal MV components and/or vertical MV components of the MV values of blocks within the unit of the video, where the horizontal MV components and vertical MV components are permitted to have different MV precisions. Or, the selected MV precision can be for both horizontal MV components and vertical MV components of the MV values of blocks within the unit of the video, where the horizontal MV components and vertical MV components have the same MV precision.

In most of the preceding examples of selection of MV precision, the encoded video in the bitstream includes one or more syntax elements that indicate the selected MV precision for the unit. A decoder parses the syntax element(s) indicating the selected MV precision and interprets MV values according to the selected MV precision. Alternatively, the encoded video in the bitstream can lack any syntax elements that indicate the selected MV precision. For example, even if the bitstream supports signaling of MV values with a fractional-sample MV precision, the encoder can constrain motion estimation for the unit of the video to use only MV values with fractional parts of zero, and only MV values that indicate integer-sample offsets are used in motion compensation. A decoder reconstructs and applies MV values at the fractional-sample MV precision (where the MV values indicate integer-sample offsets). This may reduce computational complexity of decoding by avoiding interpolation operations.

IX. Detecting Scene Changes Using Hash Matching

This section presents various approaches to detect scene changes based on hash matching. Scene changes can be detected during video encoding. For example, pictures that are identified as scene change pictures can be used to improve coding efficiency (e.g., reference pictures can be determined based, at least in part, on whether a given picture is a scene change picture).

A. Detecting a Scene Change Picture

Scene change is detected using, at least in part, information indicating how many blocks of a current picture have hash matches in a hash table (generally called a "match rate," "match ratio," or "R") in relation to previous pictures. In some implementations, the match rate is calculated as: $R=(C+S+M)/T$. Alternatively, the match rate can be calculated as: $R=(C+M)/T$ or as $R=M/T$. For a current picture, the match rate is labeled "Rcurr". In addition, an average match rate can be calculated from previous pictures (previous to the current picture). For example, an average of all previous coded pictures can be maintained or an average over a number of previous pictures (e.g., using a sliding window). The average match rate is labeled "Ravg".

In some implementations, if Rcurr is smaller (e.g., significantly smaller) than Ravg, then the current picture can be identified as a scene change picture. In some implementations, if $Rcurr < a*Ravg$, then the current picture is detected as a scene change picture. The value of "a" (a weight value) is set to 0.5 in a specific implementation.

B. Long-Term Reference Picture Selection

In video coding, motion compensation from reference pictures is used to remove temporal redundancy. Thus, reference pictures can be very important to coding efficiency. In some implementation, both short-term reference pictures and long-term reference pictures are used. Short-term reference pictures are usually a number of pictures not too far away from the current coding picture. Long-term reference pictures may be stored in the decoded picture buffer ("DPB") for a relatively longer time. Long-term reference pictures are helpful to improve the coding efficiency for some screen content, where duplicated scenes may occur or duplicated windows may occur later in the video sequence. In some implementations, pictures before a scene change (e.g., immediately before a scene change) are retained as long-term reference pictures, while pictures during the scene change are not retained.

To illustrate various examples of long-term reference picture selection, the following example sequence of pictures is used:

$f0(s0), f1(s0), f2(s0), f3(s0), f4(s0), f5(s0), f6(s0), f7(s0\text{->}1), f8(s0\text{->}1), f9(s0\text{->}1), f10(s0\text{->}1), f11(s1)$
$f12(s1)$ In this example sequence there are 13 pictures (labeled "f0" through "f12) and two scenes (labeled "s0" and "s1"). A transition between the first scene and the second scene is labeled "s0->1". As depicted in the example sequence, pictures f0 through f6 belong to the first scene s0, pictures f7 through f10 are transition pictures from the first scene s0 to the second scene s1, and pictures f11 and f12 belong to the second scene s1. If the example sequence of pictures contains screen content, then the match rate for f0, f1, f2, f3, f4, f5, and f6 is likely to be relatively high, the match rate for f7, f8, f9, f10, and f11 is likely to be relatively low, and the match rate for f12 is likely to be relatively high.

Based on results of various encoding situations, retaining the last picture of the previous scene can be helpful in improving coding efficiency. Therefore, with the example sequence above, f6 would be retained as a long-term reference picture. In some implementations, the decision of whether to retain a given picture as a long-term reference picture is made when encoding the current picture. For example, the decision of whether to retain fn-1 as a long-term reference picture is made when encoding fn (the current picture). In a specific implementation, if the following two conditions are satisfied, then fn-1 is retained as a long-term reference picture:

1. Matching rate Rn (Rcurr for the current picture fn) is lower than a threshold (indicating that fn is detected as scene change picture).

2. The matching rates of all the previous X pictures (Rn-1, Rn-2, . . . Rn-X) are higher than a threshold (indicating a stable scene, which can prune out the pictures during scene change, such as f7, f8, f9).

Using the above two conditions, the beginning of a scene change can be detected that occurs immediately following a stable scene of X pictures. Using the above example sequence, if the two conditions are applied when encoding current picture f7, the match rate of f7 can be found to be lower than a threshold (indicating that f7 is a scene change picture) while the previous X pictures (e.g., f6, f5, f4, etc.) can be found to be higher than a threshold. As a result, if the two conditions are satisfied, then f6 can be retained as a long-term reference picture.

C. Picture Quality Adjustment

In the example sequence above, if there are many pictures in the second scene s1 (with very little change among them), encoding the first few pictures in s1 with better quality may be helpful to improve the coding efficiency. In some implementation, QPI and lambdaI are used to encode intra picture and other QP values and lambda values are used to encode P and B pictures (e.g., usually larger than QPI and lambdaI, and may also be different for different P and B pictures).

In some implementations, a current picture is encoded with better quality (e.g., encoded using QPI and lambdaI) if the current picture is detected to be the start (or near the beginning) of a new scene by hash-based block match. For example, by encoding pictures at, or near, the beginning of a stable scene with higher quality, encoding efficiency and/or quality of subsequent pictures in the same stable scene can be improved.

If pre-analysis is allowed, detecting whether a current picture is at the beginning of a new stable scene can be a straightforward task. For example, the next X pictures after the current picture can be checked. If the current picture has a match rate that is relatively low while the next X pictures have a match rate that is relatively high, the encoder may encode the current picture with relatively high quality. For example, using the example sequence above, the encoder may find that the match rate of f11 is relatively low while the match rates of f12, f13, and f14 are relatively high. In this situation, f11 can be determined to be at the beginning of a new stable scene and therefore encoded with better quality.

In a specific implementation, if the following two conditions are satisfied, the current picture fn is coded with better quality (e.g., encoded with QPI and lambdaI):

1. Matching rate Rn is lower than a threshold (indicating fn is detected as the start of a new scene).

2. The matching rates of all future X pictures (Rn+1, rn+2, . . . Rn+X) is higher than a threshold (indicating a stable scene).

If preanalysis is not allowed, the encoder may not be able to make a decision at the beginning of a new stable scene, and may instead have to wait for a few pictures before a new stable scene can be confirmed. For example, the encoder can wait for a number of pictures X to confirm that a new stable scene has been reached and then encode the current picture with improved quality. For example, with reference to the example sequence above, if f12, f13, f14, and f15 (where X=4) have a relatively high match rate (e.g., and f11 has a relatively low match rate) then f15 can be encoded with improved quality. In a specific implementation, if the following two conditions are satisfied, the current picture fn is coded with better quality (e.g., encoded with QPI and lambdaI):

1. The matching rate of the current picture and previous X pictures (Rn, Rn−1, Rn−2, . . . Rn−X) is higher than a threshold.

2. The matching rate of the picture n−X−1 (Rn−X−1) is lower than a threshold.

D. Example Implementations

Various methods can be provided for detecting scene changes using hash-based block matching. In addition, results of scene change information can be used for other purposes, such as long-term reference picture selection and picture quality settings during encoding.

FIG. 15 shows a generalized technique (1500) for detecting a scene change during video encoding using, at least in part, results of hash-based block matching. The technique (1500) can be performed by an encoder such as one described with reference to FIG. 3 or FIGS. 4a and 4b, or by another encoder.

The encoder encodes video to produce encoded data, which the encoder outputs as part of a bitstream. During the encoding, the encoder calculates (1510) a match rate for a current picture. The match rate is calculated using, at least in part, hash-based block matching for the current picture (with regard to one or more reference pictures). In some implementations, the match rate is calculated by classifying the blocks of the current picture into a plurality of categories. In some implementations, the match rate is calculated as R=(C+S+M)/T, or as R=(C+M)/T, or as R=M/T.

The encoder then calculates (1520) an average match rate for a plurality of previous pictures. The average match rate can be calculated by calculating an individual match rate for each of the previous picture and averaging the individual match rates. In some implementations, the match rate is calculated by classifying the blocks of a given previous picture into a plurality of categories. In some implementations, the match rate is calculated as R=(C+S+M)/T, or as R=(C+M)/T, or as R=M/T.

The encoder then calculates (1530) a weighted average match rate. For example, the encoder can multiply the average match rate by a weight value that is less than 1.0. In a specific implementation, a weight value of 0.5 is used.

The encoder then determines (1540) whether the current picture is a scene change picture based on the match rate for the current picture and the weighted average match rate. For example, the current picture can be determined to be a scene change picture if the match rate for the current picture is less than the weighted average match rate.

Various decisions can be made when the current picture is detected to be a scene change picture. For example, the picture just before the current picture can be selected as a long-term reference picture. In addition, information about when a picture (or pictures) is involved in a scene change can be used when determining picture quality parameters during encoding.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing device comprising a processing unit and memory, the computing device configured to perform operations for encoding video, the operations comprising:
   for each candidate block of multiple candidate blocks of a picture of video data:
      evaluating whether the candidate block satisfies a complexity criterion based on evaluation of sample values or coefficients of the candidate block to screen-out homogeneous blocks, a homogeneous block being a uniform block;
      if the candidate block does not satisfy the complexity criterion:
         evaluating whether the candidate block satisfies a homogeneous selection criterion, wherein the homogeneous selection criterion is satisfied when at least one of an x or a y start coordinate of the candidate block is aligned with a particular division of the picture, wherein the particular division of the picture is a grid with a particular horizontal and vertical spacing, and wherein the candidate block satisfies the homogeneous selection criterion when at least one of the x and the y start coordinate of the candidate block is evenly divisible by a pre-determined value corresponding to the grid;
         if the candidate block satisfies the homogeneous selection criterion:
            determining a block hash value for the candidate block; and
            adding the block hash value to a hash table.

2. The computing device of claim 1 the operations further comprising:
   if the candidate block satisfies the complexity criterion:
      determining a block hash value for the candidate block; and
      adding the block hash value to the hash table.

3. The computing device of claim 1 the operations further comprising:
   if the candidate block does not satisfy the homogeneous selection criterion:
      omitting the candidate block from the hash table.

4. The computing device of claim 1 wherein the candidate block does not satisfy the complexity criterion when the candidate block is one or more of horizontally homogeneous and vertically homogeneous, where the candidate block is horizontally homogeneous when the candidate block has rows of uniform sample values, and wherein the candidate block is vertically homogeneous when the candidate block has columns of uniform sample values.

5. The computing device of claim 1 wherein the candidate block satisfies the homogeneous selection criterion when the x start coordinate of the candidate block is evenly divisible by a first pre-determined value and the y start coordinate of the candidate block is evenly divisible by a second predetermined value, wherein the first and second pre-determined values correspond to the grid.

6. The computing device of claim 5 wherein the first pre-determined value is a width of the candidate block and the second pre-determined value is a height of the candidate block.

7. The computing device of claim 5 wherein the first pre-determined value is 16 and the second pre-determined value is 16.

8. A method, implemented by a computing device, for encoding video, the method comprising:
for each candidate block of multiple candidate blocks of a picture of video data:
evaluating whether the candidate block satisfies a complexity criterion based on evaluation of sample values or coefficients of the candidate block to screen-out homogeneous blocks, a homogeneous block being a uniform block;
if the candidate block does not satisfy the complexity criterion:
evaluating whether the candidate block satisfies a homogeneous selection criterion, wherein the homogeneous selection criterion is satisfied when at least one of an x or a y start coordinate of the candidate block is aligned with a particular division of the picture, wherein the particular division of the picture is a grid with a particular horizontal and vertical spacing, and wherein the candidate block satisfies the homogeneous selection criterion when at least one of the x and the y start coordinate of the candidate block is evenly divisible by a pre-determined value corresponding to the grid;
if the candidate block satisfies the homogeneous selection criterion:
determining a block hash value for the candidate block; and
adding the block hash value to a hash table.

9. The method of claim 8, further comprising:
if the candidate block satisfies the complexity criterion:
determining a block hash value for the candidate block; and
adding the block hash value to the hash table.

10. The method of claim 8, further comprising:
if the candidate block does not satisfy the homogeneous selection criterion:
omitting the candidate block from the hash table.

11. The method of claim 8 wherein the candidate block does not satisfy the complexity criterion when the candidate block is one or more of horizontally homogeneous and vertically homogeneous, where the candidate block is horizontally homogeneous when the candidate block has rows of uniform sample values, and wherein the candidate block is vertically homogeneous when the candidate block has columns of uniform sample values.

12. The method of claim 8 wherein the candidate block satisfies the homogeneous selection criterion when the x start coordinate of the candidate block is evenly divisible by a first pre-determined value and the y start coordinate of the candidate block is evenly divisible by a second predetermined value, wherein the first and second pre-determined values correspond to the grid.

13. The method of claim 12 wherein the first pre-determined value is a width of the candidate block and the second pre-determined value is a height of the candidate block.

14. The method of claim 12 wherein the first pre-determined value is 16 and the second pre-determined value is 16.

15. One or more computer-readable storage media storing computer-executable instructions for causing a computing device programmed thereby to perform operations for encoding video, the operations comprising:
for each candidate block of multiple candidate blocks of a picture of video data:
evaluating whether the candidate block satisfies a complexity criterion based on evaluation of sample values or coefficients of the candidate block to screen-out homogeneous blocks, a homogeneous block being a uniform block;
if the candidate block does not satisfy the complexity criterion:
evaluating whether the candidate block satisfies a homogeneous selection criterion, wherein the homogeneous selection criterion is satisfied when at least one of an x or a y start coordinate of the candidate block is aligned with a particular division of the picture, wherein the particular division of the picture is a grid with a particular horizontal and vertical spacing, and wherein the candidate block satisfies the homogeneous selection criterion when at least one of the x and the y start coordinate of the candidate block is evenly divisible by a pre-determined value corresponding to the grid;
if the candidate block satisfies the homogeneous selection criterion:
determining a block hash value for the candidate block; and
adding the block hash value to a hash table.

16. The one or more computer-readable storage media of claim 15, the operations further comprising:
if the candidate block satisfies the complexity criterion:
determining a block hash value for the candidate block; and
adding the block hash value to the hash table.

17. The one or more computer-readable storage media of claim 15, the operations further comprising:
if the candidate block does not satisfy the homogeneous selection criterion:
omitting the candidate block from the hash table.

18. The one or more computer-readable storage media of claim 15, wherein the candidate block does not satisfy the complexity criterion when the candidate block is one or more of horizontally homogeneous and vertically homogeneous, where the candidate block is horizontally homogeneous when the candidate block has rows of uniform sample values, and wherein the candidate block is vertically homogeneous when the candidate block has columns of uniform sample values.

19. The one or more computer-readable storage media of claim 15, wherein the candidate block satisfies the homogeneous selection criterion when the x start coordinate of the candidate block is evenly divisible by a first pre-determined value and the y start coordinate of the candidate block is evenly divisible by a second predetermined value, wherein the first and second pre-determined values correspond to the grid.

20. The one or more computer-readable storage media of claim 19, wherein the first pre-determined value is a width of the candidate block and the second pre-determined value is a height of the candidate block.

\* \* \* \* \*